US011687805B2

(12) United States Patent
Stubbs et al.

(10) Patent No.: US 11,687,805 B2
(45) Date of Patent: Jun. 27, 2023

(54) SYSTEMS AND METHODS FOR SELF-LEARNING ARTIFICIAL INTELLIGENCE OF THINGS (AIOT) DEVICES AND SERVICES

(71) Applicant: SHORELINE IOT, INC., Campbell, CA (US)

(72) Inventors: Mark Stubbs, Felton, CA (US); Sameer Bidichandani, Los Gatos, CA (US); Kabir Manghnani, Saratoga, CA (US)

(73) Assignee: Shoreline IoT, Inc., Campbell, CA (US)

( * ) Notice: Subject to any disclaimer, the term of this patent is extended or adjusted under 35 U.S.C. 154(b) by 0 days.

(21) Appl. No.: 17/086,345

(22) Filed: Oct. 31, 2020

(65) Prior Publication Data
US 2021/0133607 A1 May 6, 2021

Related U.S. Application Data

(60) Provisional application No. 62/929,042, filed on Oct. 31, 2019.

(51) Int. Cl.
*G06N 5/04* (2023.01)
*G06N 20/00* (2019.01)
(Continued)

(52) U.S. Cl.
CPC ............... *G06N 5/04* (2013.01); *G06N 20/00* (2019.01); *G16Y 10/75* (2020.01); *G16Y 20/20* (2020.01); *H04L 67/10* (2013.01)

(58) Field of Classification Search
CPC .......... G06N 5/04; G06N 20/00; G16Y 10/75; G16Y 20/20; H04L 67/10; H04L 67/12
See application file for complete search history.

(56) References Cited

U.S. PATENT DOCUMENTS 10,262,019 B1 * 4/2019 Reiner .................... H04L 67/10
2010/0271199 A1 10/2010 Belov et al.
(Continued)

FOREIGN PATENT DOCUMENTS

JP 2001161513 6/2001
JP 2016101215 7/2017

OTHER PUBLICATIONS

International Search Report and the Written Opinion of the International Searching Authority in PCT/US21/20406.

*Primary Examiner* — El Hadj M Sall
(74) *Attorney, Agent, or Firm* — Landmark Intellectual Property Law, LLC; Gregory M Murphy

(57) ABSTRACT

The invention is generally directed to systems and methods of monitoring or predicting a service event for an industrial asset using an artificial intelligence of things (AIoT) system including an AIoT device, AIoT cloud, and a self-learning AI classification and analytics engine. The device may include one or more sensors and an inference engine for reducing power consumption and detecting anomalies at the edge and sending data associated with anomalies to a signal processor for classification and AI-driven automatic configuration. Classification may be based on narrow-band analysis and/or machine learning models. If an anomaly is detected power may be provided to a communication module to send sensor data to the signal processor for classification and/or further processing. Classifications or determinations made by the signal processor or detected through a work-order system may be used to automatically retrain the inference model on the edge, so that the system is self-learning.

8 Claims, 14 Drawing Sheets

(51) Int. Cl.
*H04L 67/10* (2022.01)
*G16Y 20/20* (2020.01)
*G16Y 10/75* (2020.01)

(56) References Cited

U.S. PATENT DOCUMENTS

| | | |
|---|---|---|
| 2017/0171778 A1 | 6/2017 | Afero |
| 2018/0013831 A1 | 1/2018 | Dey et al. |
| 2018/0204111 A1* | 7/2018 | Zadeh ................ G06F 18/2413 |
| 2018/0330238 A1 | 11/2018 | Luciw et al. |
| 2019/0311731 A1 | 10/2019 | Haines et al. |
| 2020/0167724 A1 | 5/2020 | Klitenik et al. |
| 2020/0258031 A1* | 8/2020 | Makhija ................ G06N 20/00 |
| 2020/0265119 A1* | 8/2020 | Desai ................ G05B 19/0426 |

* cited by examiner

SYSTEMS AND METHODS FOR SELF-LEARNING ARTIFICIAL INTELLIGENCE OF THINGS (AIOT) DEVICES AND SERVICES

RELATED APPLICATIONS

The present invention claims priority to U.S. Provisional Patent Application No. 62/929,042, filed one 31 Oct. 2019, entitled "Systems and Methods for Deep Learning-Based Anomaly Detection," which is incorporated by reference herein in its entirety.

BACKGROUND

The present invention generally relates to Internet of Things (IoT), and more specifically, to artificial intelligence of things ("AIoT")-based devices, methods, and/or system for determining anomalies, alerting one or more users, and/or initiating maintenance of industrial assets.

In general, "Internet of Things" is a network of identifiable, purposed "things" that are enabled to communicate data over a communications network, such that the communicated data may at least in part form a basis for controlling, modifying, or maintaining the operation of the "things." Generally speaking, an asset becomes a "thing" when the asset is equipped with one or more sensors capable of capturing one or more types of data pertaining to asset.

Heavy industrial environments, such as environments for large scale manufacturing (such as of aircraft, ships, trucks, automobiles, and large industrial machines), process industries (pulp & paper mills, chemicals and petrochemicals, building materials) energy production environments (such as oil and gas plants, renewable energy environments, and others), energy extraction environments (such as surface mining, drilling, and the like), heavy metals (steel, etc.), water and wastewater infrastructure, construction environments (such as for construction of large buildings), and others, may often involve highly complex machines, devices and systems and highly complex workflows, in which operators must account for a host of parameters, metrics, and the like in order to improve or optimize design, development, deployment, and operation of different technologies in order to improve overall results. Historically, data has been collected in heavy industrial environments by human beings using dedicated data collectors, often recording batches of specific sensor data on media, such as tape or a hard drive, for later analysis. Batches of data have historically been returned to a central office for analysis, such as by undertaking signal processing or other analysis on the data collected by various sensors, after which analysis maybe used as a basis for diagnosing problems in an environment and/or suggesting ways to improve operations. Historically, this work has taken place on a time scale of weeks or months and has been directed to limited data sets.

For example, typical or traditional maintenance of assets (including but not limited to highly critical assets) is generally a reactive procedure. Generally, an asset requires service (as indicated by a technician, customer, or even by performance data), and a customer requests help. A technician then visits the site—often without any background or content on what type of issue the technician may be required to address. Once the technician identifies the issue, parts often need to be ordered, delivered, or even picked up before the technician may return in hours, days, or even weeks to repair the asset. This manual and labor-intensive process results in slow maintenance, which may also be unnecessarily expensive, as issues may not be identified until failure. This often results in only scheduled maintenance being performed on highly critical assets, with critical and sub-critical assets frequently run to failure and then replaced.

Assets that are monitored by dedicated data collectors may be more frequently monitored, but such data collection is time-intensive, costly, and therefore frequently only conducted with low frequency.

The emergence of the IoT and AIoT has made it possible to connect continuously to and among a much wider range of devices. Most such devices are consumer devices, such as lights, thermostats, and the like. More complex industrial environments remain more difficult, as the range of available data is often limited, and the complexity of dealing with data from multiple sensors makes it much more difficult to produce "smart" solutions that are effective for the industrial sector. A need exists for improved methods and systems for data collection in industrial environments, as well as for improved methods and systems for using collected data to provide improved monitoring, control, and intelligent diagnosis of problems and intelligent optimization of operations in various heavy industrial environments.

However, systems and methods known in the industry continue to be undesirable. Known sensors and devices are expensive, difficult to install (often requiring a trained installer), difficult to configure, and often require frequent maintenance. Sensors as currently used in the art often comprise complex hardware, require complex network connectivity (such as but not limited to specific gateway architecture and connection), and often require power connection. Sensors that rely on batteries rather than a power connection generally need frequent (approximately every three (3) months) battery changes, thereby requiring constant maintenance.

Therefore, devices, systems, and methods of using one or more sensors to monitor assets in real-time, substantially real-time, or near real-time and determine anomalies are desired, with such devices, systems, and methods being easily set up, easily configured (such as allowing for customer self-install), scalable on various levels, provide continuous monitoring of assets, and/or trigger as-needed corrective actions. Such devices may include on-board cellular communication capability, direct connection to the cloud (or other distributed computing systems), as well as advanced machine learning models at the edge to provide actionable local intelligence and self-learning. In short, it is desirable to provide an affordable and smart AIoT solution that a user can install without expertise in networking, IoT, artificial intelligence, and/or cloud management or processing, etc. Furthermore, such devices, systems, and methods may extend the economic life of assets, while reducing total cost of asset ownership and capital replacement costs.

SUMMARY OF THE INVENTION

In accordance with some embodiments of the present invention, aspects may include a system for predicting a service event for an industrial asset from sensor data, comprising at least one device mounted on or proximate to the industrial asset, the device comprising one or more sensors, a local machine learning inference engine, a wireless communication system, a memory, and a power source; a cloud-based In accordance with some embodiments of the present invention, aspects may include a method of providing power savings in an artificial intelligence of things (AIoT) device, the AIoT device used to monitor or predict a service event for an industrial asset, the device comprising one or more sensors, a machine learning inference engine, a communication module, a data store, a processor, and a power source, the method comprising: maintaining the device in a state of deep sleep during shipment and times of non-use; maintaining the device in a sensor-hint state, during which the one or more sensors may be active and energized to receive a sensory input; if the sensory input to the one or more sensors exceeds a threshold: gathering data from the one or more sensors and providing the data to the machine learning inference engine; using the machine learning inference engine to determine if the data is anomalous; if the data is anomalous, energizing the communication module and sending the anomaly classification and at least some portion of the data to a signal processor, which may be a remote, cloud-based processor; if the data is not anomalous, returning the device to the sensor-hint state; if the sensory input to the one or more sensors does not exceed the threshold, returning the device to the sensor-hint state.

In accordance with some embodiments of the present invention, aspects may include a distributed cloud-based system for monitoring or predicting a service event for an industrial asset, the system comprising: one or more edge devices comprising one or more sensors, a machine learning inference engine, a communication module, a data store, a processor, and a power source; one or more signal processors, which may be in some circumstances a cloud-based processors comprising: a narrow-band classifier; a machine-learning classifier; and a work order system; wherein: the one or more edge devices are configured to determine using the machine learning inference engine if an anomaly is detected in data received from the one or more sensors, and if so: communicate with the one or more signal processors to provide at least some of the data; the one or more cloud-based processors configured to receive at least some of the data and attempt to classify the anomaly using the narrow-band classifier and the machine learning-classifier; if the one or more signal processors cannot classify the anomaly, communicating with the work order system to generate a work order for a technician visit; if the one or more cloud-based processors classifies the anomaly, determine alerts, corrective actions, and/or maintenance requests associated with the anomaly.

In accordance with some embodiments of the present invention, aspects may include a method of monitoring or predicting a service event for an industrial asset using an artificial intelligence of things (AIoT) device, the AIoT device being in communication with a cloud-based processor, the AIoT device comprising one or more sensors and a machine learning inference engine, the cloud processor comprising a narrow-band classifier and a machine-learning classifier, the method comprising: at the AIoT device: gathering data from the one or more sensors and providing the data to the machine learning inference engine; using the machine learning inference engine to determine if the data includes an anomaly; and sending at least some of the data to the cloud-based processor; at the cloud-based processor, receiving at least some of the data from the AIoT device: attempting to classify the anomaly determined by the machine learning inference engine using a narrow-band classifier, and if successful determining alerts, corrective actions, and/or maintenance requests associated with the anomaly; if the narrow-band classifier is not successful at classifying the anomaly determined by the machine learning inference engine, providing at least some of the data to the machine-learning classifier and attempting to classify the anomaly determined by the machine learning inference engine, and if successful determining alerts, corrective actions, and/or maintenance requests associated with the anomaly; if the machine-learning classifier is not successful at classifying the anomaly determined by the machine learning inference engine, providing at least some of the data to a technician or work order system; if the technician or work order system identifies the anomaly determined by the machine learning inference engine, retraining the machine-learning classifier based on such determination; if the technician or work order system determines that the anomaly determined by the machine learning inference engine is a false positive, retraining the machine learning inference engine based on such determination.

In accordance with some embodiments of the present invention, aspects may include a method of monitoring or predicting a service event for an industrial asset using an artificial intelligence of things (AIoT) device without the need for historical data, the AIoT device being in communication with a cloud-based processor, the AIoT device comprising one or more sensors and a machine learning inference engine, the cloud processor comprising a narrow-band classifier and a machine-learning classifier, the method comprising: during a training mode: gathering data only from the AIoT device, the data being collected by the one or more sensors and periodically providing the data to the cloud based processor; using the data to train a machine learning inference engine and a machine learning model; storing the machine learning inference engine on the AIoT device to provide edge processing capability; storing the machine learning model accessible by the cloud-based processor; during an operational mode: using the machine learning inference engine to determine if the data includes an anomaly, and if so, sending at least some of the data to the cloud-based processor; at the cloud-based processor, receiving at least some of the data from the AIoT device and classifying the anomaly using a narrow-band classifier, or a machine-learning classifier; if the anomaly is classified, determining alerts, corrective actions, and/or maintenance requests associated with the anomaly; if the anomaly is not classified, providing at least some of the data to a technician or work order system; if the technician or work order system classifies the anomaly retraining the machine-learning classifier based on such classification; if the technician or work order system determines that the anomaly determined by the machine learning inference engine is a false positive, retraining the machine learning inference engine based on such determination.

These and other aspects will become apparent from the following description of the invention taken in conjunction with the following drawings, although variations and modifications may be affected without departing from the spirit and scope of the novel concepts of the invention.

DESCRIPTION OF THE FIGURES

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
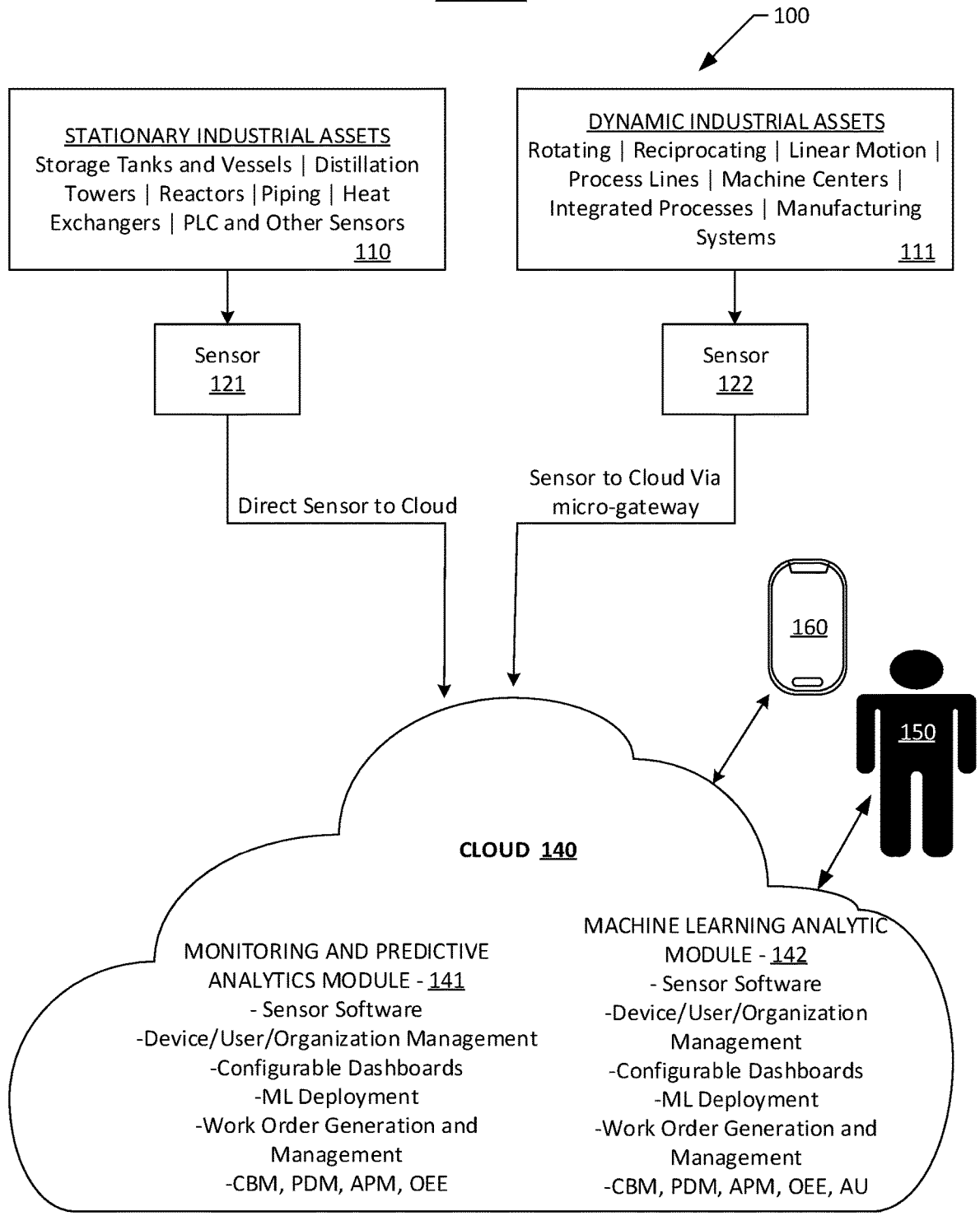
FIG. 1 illustrates, in accordance with some embodiments of the present invention, an exemplary system of monitoring and managing various industrial assets.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

The present invention is generally directed to remote condition monitoring and predictive maintenance of assets. As noted above, there are various advantages of the present invention over existing technology and art, including but not limited to ease of deployment and on-boarding. The system can identify anomalies and detect real-time machine failures using machine learning inference engines deployed in devices and edge devices. In accordance with some embodiments, systems and methods of the present invention may be used to manage asset performance, increase usable lifetime of assets (thereby potentially reducing capital expenditure associated with replacing assets), reduce operational expenditure (for example, associated with costly repairs that could have been avoided), determine overall equipment efficiency of one or more facilities, etc.

As briefly noted above, the present invention is generally directed to Artificial Intelligence of Things (AIoT), and more specifically, to IoT-based devices, methods, and/or system for determining anomalies, alerting one or more users, and/or initiating maintenance of industrial assets. Monitoring and predictive analytics of various assets is highly desirable, and systems and methods in accordance with some embodiments of the present invention can support multiple industries, assets, systems, and configurations.

In general, the present invention provides users with actionable asset and process system performance, which may provide for prolonged economic useful life. Through the use of anomaly detection at the edge, causal factors may be removed, and timely preventative actions may be conducted to prevent and/or reduce the chance of asset failure. As discussed in greater detail below, predictive analytics may provide a user with various actionable information.

Before delving into details regarding devices, systems, and/or methods in accordance with some embodiments of the present invention, an overview of use may be helpful. With reference to FIG. 1, an exemplary system 100 of monitoring and managing various industrial assets is illustrated. Assets may include stationary assets 110 as well as dynamic assets 111. Stationary assets 110 may include, but not limited to, motor operated valves, storage tanks and vessels, distillation towers, reactors, piping, heat exchangers, and/or other programmable logic controller (PLC) sensors. Dynamic assets 111 may comprise rotating assets (motors, bearings, pumps, compressors, fans, flowers, etc.), reciprocating engines, compressors, pumps, process lines, machining centers, linear motion, integrated systems, and or other dynamic components or assets.

Sensors 121, 122 may be affixed, attached, and/or proximate to the assets. Sensors 121, 122 may communicate directly to a cloud 140, or may communicate with the cloud via a micro-gateway, wireless internet connection (Wi-Fi), etc.

Cloud 140 may comprise a predictive analytics module 141 and a machine learning (ML) analytic module 142. Monitoring and predictive analytics module 141 may comprise and/or work with sensor software, device and user management, present user configurable dashboards, provide for tiny machine learning (tinyML) generation and deployment, work with work order systems, and assist with condition based maintenance (CBM), predictive maintenance (PDM), asset performance management (APM), and/or overall equipment effectiveness (OEE) determinations, alerts, and/or information.

Information regarding an asset 110, 111, detected by a sensor 121, 122, may be sent to cloud 140, and provided to a user 150 via a web or mobile application 160. The user 150 may receive an alert regarding an asset or may check on asset status by visiting a dashboard generated from information received and processed by the monitoring and predictive analytics module 141. Following this general description of the invention, aspects and features will now be examined in greater detail.

Use Cases. Systems and methods in accordance with some embodiments of the present invention may monitor and predict anomalous behavior of a wide variety of industrial assets. Predictive analytics may be used to monitor assets in various industries, including but not limited to: manufacturing, pulp and paper, oil and gas, water and wastewater treatment, metals and minerals, infrastructures (e.g., high speed rail systems, roads, bridges, power supplies, etc.), power generation, power distribution (including but not limited to demand response actions, etc.), etc.

Assets and processes that may be monitored include, but are not limited to motors, engines, fans, pumps, valves, compressors, conveyors, heat exchangers, sensors, flow and flow meters, process controls, tanks, linear motion, process lines, fans, chillers, blowers, conveyors, cold rolling mills, tension levelers, annealing devices, computer numeric controlled (CNC) machines, robots, automated systems, diesel engines, reciprocating gas compressors, screw gas compressors, pipelines, etc.

Predictive analytics at the edge may be used to obtain and provide various types of information and anomaly alerts. For example, systems and methods of the present invention may be utilized to determine situations associated with worn bearings, misaligned shafts, noise from bushings or bearings, prolonged moisture exposure, pressure loss, flow variances, excess temperatures, etc.

Such information may be analyzed to determine anomalies that may be associated with: (i) foundation deterioration; (ii) loose mounting bolts; (iii) mechanical imbalance; (iv) crankshaft bearing wear; (v) unbalance and moments caused by reciprocating parts; (vi) looseness, structural resonance, induced stress, torque fluctuation, pressure pulsation-induced unbalance; (vii) frame, rotor, scrubber, cylinder, bottle, piping, and structural natural frequencies; (viii) acoustic resonance (e.g., associated with a compressor); (ix) crosshead bearing wear, rod drop, scoring, excessive clearance, excessive temperature, rod load, abnormal crosshead forces caused potentially by gas pressure and reciprocating inertia; (xi) inlet and outlet valve flutter, valve hysteresis, loss of spring memory, cracked or broken springs, excessive temperature, leakage, timing; (xii) piston clearance, piston stretch, pressure-volume performance, piston ring and rider band wear, bypass, ineffective cooling, excessive pulsation, rod run-out, over travel; and/or (xiii) thermodynamic performance In accordance with some embodiments of the present invention, vibration analysis may utilize phase-angle, time- and frequency-domain data, which may incorporate seismic, narrow bands, and/or high frequency bandwidths. Such information may be used to evaluate operating conditions, dynamic energy, and/or the status of specific components within a system.

Regarding a compressor, various factors may be monitored and/or analyzed. For example, vibration analysis, ultrasound analysis, temperature, barometric pressure and humidity, sound analysis, and/or various other analog or digital inputs may be monitored and analyzed to provide alerts regarding anomalies. Airborne and structural ultrasounds to monitor high frequencies (for example, over 30 kHz), which may be utilized to evaluate aerodynamic instability, pulsation, acoustic resonances or emissions, structural stress, leaks, bypass, and/or other abnormal conditions that may manifest as high frequency events. Ambient and compressor temperature may also be monitored to detect anomalies associated with thermodynamics of the compressor, as well as potential friction, misalignment, and/or other deviations from normal operations. Barometric pressure and humidity may be monitored and used to calibrate compressor profiles for changing ambient circumstances. Additional analog or digital inputs may also be received by the system, for example including but not limited to thermocouples, proximity probes, flow meters, etc.

With regard to fans, chillers, pumps, blowers, conveyors, etc. various factors may be monitored and/or analyzed, including but not limited to: foundation degradation, loose mounting bolts, baseplate flexing, misalignment, imbalance, bearing degradation, efficiency, resonance, aerodynamic and/or hydraulic instability.

With regard to cold rolling mills, tension levelers, and/or annealing devices or processes, factors monitored and analyzed may include, but are not limited to: chatter, roll deterioration, excessive roll bending, bearing condition, roll alignment, roll bearing, and/or drive deterioration.

With regard to a CNC machine (that is, a computer numerical control machine), spindle and/or tool wear, cutting tool chatter, mechanical looseness, excessive temperature, and/or coolant effectiveness may be monitored and/or analyzed.

With regard to a diesel engine, factors such as humidity reaction, turbo efficiency and remaining life, crankshaft imbalance, crankshaft bearing degradation, piston bushing wear, piston ring bypass, cylinder scoring, etc. may be monitored and/or analyzed.

Similarly, for a reciprocating gas compressor factors monitored and/or analyzed may include crankshaft bearing failures, inlet/outlet valve failures, timing induced failures, piston and cylinder wall scoring and/or failure, loss of volume and/or pressure. Screw gas compressors may have thrust bearing damage and/or failure, rotor damage and/or failure, internal wear on rotor or thrust bearings, etc. monitored.

Storage tanks may be monitored for leaks, stress induced structural failures, piping, valve, and/or control failures, level sensor failures. Centrifugal pumps may be monitored for loss of flow or pressure, hydraulic instability, excessive power consumption, physical pump failure, etc. Pipelines may be monitored for equipment failures, valve actuator failures, hysteresis, valve failures, stress induced structural failures, cavitation and/or obstructions, and/or leaks. Alternating current (AC) motors may be monitored for loose or broken rotor bars, abnormal loading, induced loading, excessive power consumption, stator failures, rotor failures, etc.

Figure 2:
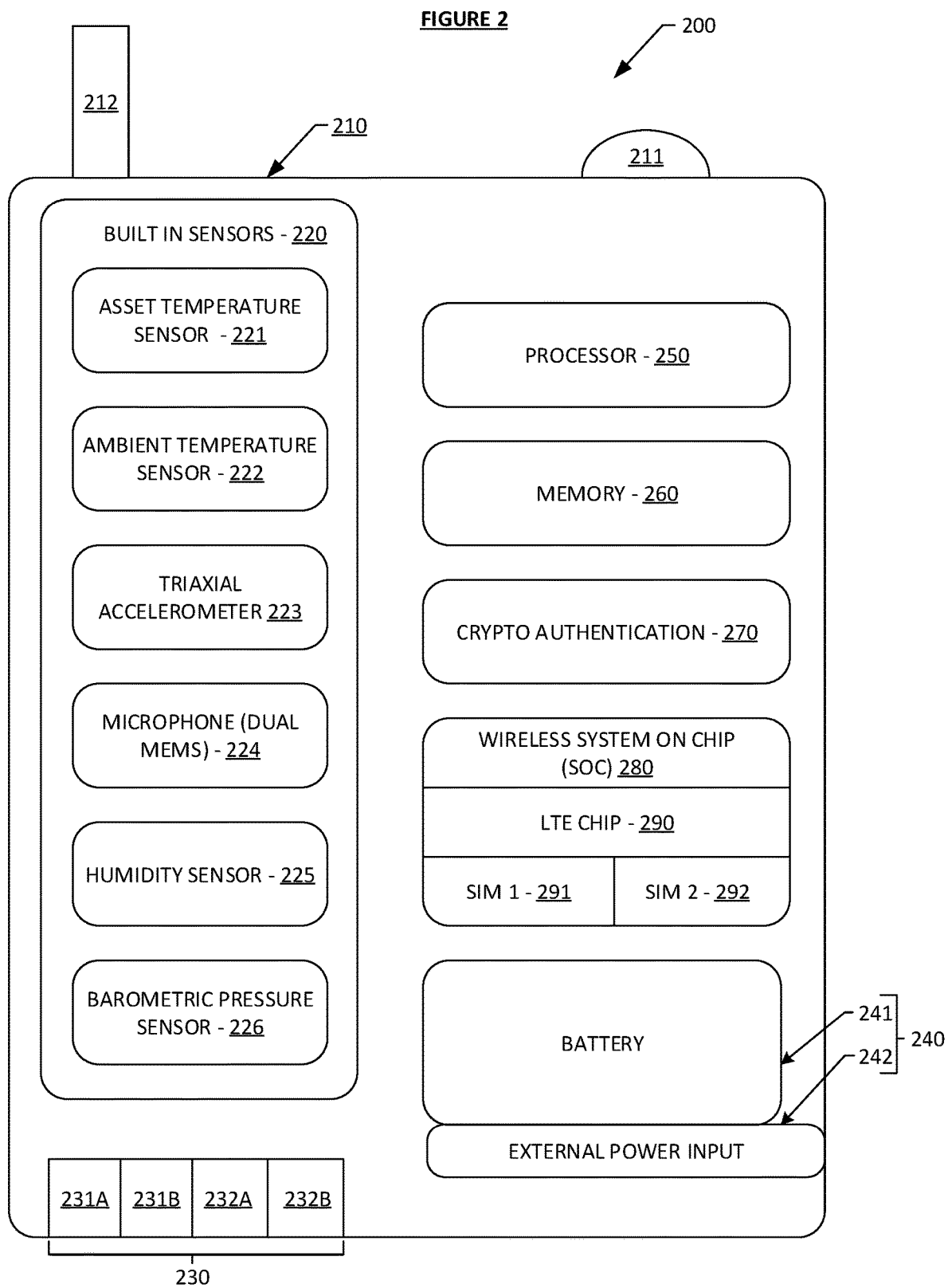
FIG. 2 illustrates, in accordance with some embodiments of the present invention, an exemplary device.

Exemplary Device. As noted above, devices in accordance with the present invention may comprise various sensors, edge processing capabilities, and communicative capabilities. More specifically, and with reference to FIG. 2, a device 200 may comprise an enclosure 210, which may house one or more components. One or more components may comprise built-in sensors 220, one or more external sensor interface 230, power source 240, processor 250, memory 260, optional crypto-authentication chip 270, and/or communicative capabilities.

One or more built-in sensors may comprise an asset temperature sensor 221, one or more temperature sensors 222, one or more accelerometers 223 (such as but not limited to a triaxial accelerometer, for example with a 5 kHz sampling rate, which may be used for sensing vibrations and/or movement), one or more microphones 224 (such as but not limited to a micro-electrical-mechanical system (MEMS) microphone) that may be configured to detect ultrasonic activity, a humidity sensor 225, and/or a barometer 226 for determining pressure. It is also to be understood that other types of sensors may be disposed within the device, particularly if use-cases so require or would make desirable.

Barometric pressure sensor 226 may track atmospheric pressure conditions inside a building, which may be useful for service as a baseline pressure to detect altitude of mobile devices in the factory for locating personnel to see how high or low assets are located. In addition, combined with global positioning system (GPS) data, such information may provide a more precise location for the mobile person or asset. Accuracy of this pressure sensor may vary but is contemplated to be approximately and/or at least +/−0.6 meters.

One or more temperature sensor 221 may be used to sense environmental temperature and/or asset temperature. Environmental (or ambient) temperature sensors may detect actual environmental temperature since it may not have optimal flow and may be influenced by the asset to which the product is attached. For applications where the asset matches, or is substantially the same as the environment temperature, the reading of an ambient temperature sensor 222 will track the environment. The usage of an environmental temperature sensor is to detect the temperature difference between the asset and the surrounding environment. This may assist in understanding the differences in temperature of the asset compared to the environment. Asset temperature sensors may be internal sensors, although it is considered that external asset temperature sensors may be used and may supply information to the device 200 via external sensor interface 230. or if the environment is hot.

The one or more external sensor interfaces 230 may comprise one or more analog input ports 231A, 231B and/or one or more digital input ports 232A, 232B. For example, external sensor interface may comprise, but is not limited to Modbus RTU/RS485, digital inputs/outputs, analog inputs, etc. More specifically, external sensors may be limited to those with an output of less than ten (10) volts or 4-20 micro amperes (mA). Pin connectors in various embodiments may be utilized for connections. In accordance with some embodiments of the present invention, the one or more external sensors may include, for example, temperature probes, ultrasonic level and distance sensors, flow rate sensors, water leakage detection sensors, gas detection sensors, fluid viscosity detection sensors (such as for oil), proximity detection sensors, voltage sensor, current sensors, fluid level sensors, flow rate sensors, pressure sensors, external temperature probe sensors, occupancy detection sensors, smoke detection sensors, carbon dioxide ($CO_2$) or carbon monoxide (CO) detection sensor, and/or any other type of sensor.

Power source 240 may comprise a battery 241, and/or an external power receptacle 242, which may be configured to receive power from an external source. Battery selection may vary, though it is contemplated that one or more batteries as known in the art (for example, lithium batteries) may be utilized by the present invention. Selected batters may provide for an average current draw of 45 uA, with a peak draw of 10 mA with BLE communication, 500 mA with CAT-NB/CAT-M1 communication. The battery may be standard and replaceable, in order to provide a customer with increased convenience should a battery change be required or desired.

In accordance with some embodiments of the present invention, the processor 250 may comprise a microcontroller with execute-in-place (XIP)/serial-peripheral-interface (SPI) flash (such as Quad-SPI—QSPI), and may have memory expansion, low power operation, a clock frequency of 96 MHz, a processor core (for example, a Cortex-M4), a serial wire debug access port, and firmware for images and encrypted keystore.

Communicative capabilities may comprise a wireless system on a chip (SOC) 280, and/or a Long-Term Evolution (LTE) chip 290. LTE chip 290 may be in contact with SIM ports 291, 292, configured to receive SIM cards. The device 200 may further comprise one or more light emitting diodes (LEDs) 211 that may indicate a status of the device 200, as well as an antenna 212.

As noted above, devices in accordance with some embodiments of the present invention may utilize wireless micro-gateways, cellular communications, wi-fi communications, Bluetooth communications, and/or ethernet communications. Cellular communications may ride on 4G LTE, 2G, and it is contemplated that such communications may ride on 5G networks, and/or LTE CAT-M1 (category M1, low-power wide area cellular technology) and/or CAT-NB (narrowband)cellular. It is contemplated that communications may be through any other sort of communication system as known, including but not limited low-power wide-area networks (LPWAN) such as LoRa (long range), MIoTy (massive-IoT), peer-to-peer communications, Zigbee, etc.

Note that it is intended, and may be more desirable, if the device is mounted in a known orientation. However, the orientation of the device may be determined based on sensor data received. Furthermore, since the edge processing determines if an anomaly is determined based on models frequently trained with that particular device (in that particular orientation), whatever the orientation of the device is will form the platform for capturing training data (rather than purely pretrained models). In other words, the baseline of "normal" operation of the device is based upon its orientation, and future readings are compared to this baseline.

This feature may also be particularly relevant in crowded facilities where other and/or different assets may also be detected by devices. For example, a large machine (for example, a press) may cause measurable vibrations on the floor, thereby producing vibrations on a second asset that are not associated with the operation of the second asset. However, because the data for the machine learning model is based upon actual data (and, potentially coupled with identification of false positives by a technician—as discussed below), the model learns the operating conditions and circumstances (even seasonal conditions) and can adjust accordingly.

While the specific configuration of the enclosure and device may not impact the functionality of the systems and methods of the present invention, the inventors built a desirable device wherein a bottom cover of the enclosure is mounted and/or attached using a magnet, adhesive (such as but not limited to epoxy), tape, and/or a mechanical fastener such as a screw). The enclosure may further comprise an airflow port for temperature and humidity sensors, as well as ports for microphones. Such ports may be protected by a membrane, for example one comprised of polytetrafluoroethylene (PTFE). The enclosure shall thermally couple the sensor package to the monitored object. We shall power up the sensor once per minute and check the temperature reading.

Further, there may be certain considerations when the components are arranged in the enclosure. For example, components may be arranged to provide a tight thermal coupling to a bottom temperature sensor through the enclosure. Similarly, it may be desirable to have the battery door accessible even if the device is permanently mounted to an asset. It may be desirable for the battery to remain with a removable part of device/enclosure (to prevent the battery from falling out onto the asset). The battery may be placed away from heat detecting sensors. It is contemplated that devices may be shipped with batteries installed, or batteries may be shipped separately for customer installation. Ports and connectors may be positioned to be accessible when the device is mounted on an asset.

Regarding enclosure 210, it may generally be as small as possible to adequately and properly house the required and/or desired components. In accordance with some embodiments of the present invention, it is desirable that the enclosure be compliant with National Electric Manufacturers Association (NEMA) 4/4X, IP67 rated ("weather tight"), Hazardous Location Class I Division 1, capable of indoor or outdoor use, and protect the internal components from windblown dust and rain, splashing water, hose directed water, and undamaged by ice that may form on the enclosure.

It is contemplated that such devices may be functional in environments with a temperature range from –30 C to 60 C for battery powered devices, and –40 C to 85 C for externally powered devices, as well with non-condensing humidity levels up to 90%, and capable of sustaining vibration up to fifty gravitational force equivalents (50 gs). Devices may be Federal Communication Commission (FCC) Part 15, subpart B and C (unintentional and intentional radiators) compliant, as well as Underwriter Laboratories (UL) 94V-0 and CE RED (radiated emissions directive) compliant.

Figure 3:
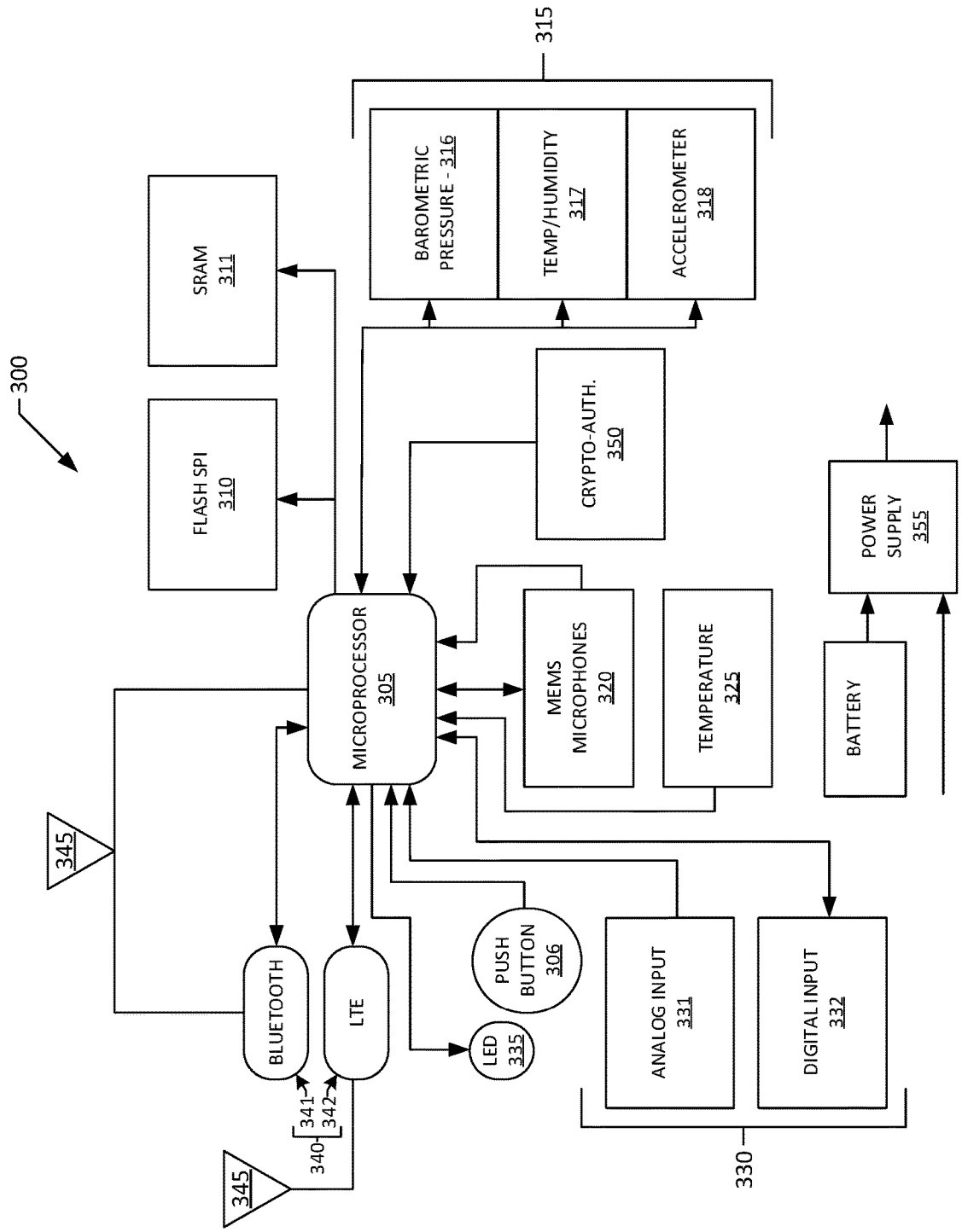
FIG. 3 illustrates, in accordance with some embodiments of the present invention, an exemplary device.

FIG. 3 illustrates a block diagram of an exemplary device 300, in accordance with some embodiments of the present invention. Microprocessor 305 may be in communication with flash SPI 310, and potentially with additional static random-access memory (SRAM) 311. Microprocessor 305 may also be in communication with sensors 315, which may comprise barometric pressure sensor 316, temperature/humidity sensor 317, and/or accelerometer 318. Microprocessor 305 may also be in communication with microphones 320 and an additional temperature sensor 325. Various inputs 330, such as analog input 331 and digital input 332 may provide access to microprocessor 305, which may also control one or more LEDs 335, and communication components 340. Communication components 340 may comprise Bluetooth chips 341, LTE chips 342, as well as communication to one or more antennas 345. In some embodiments, microprocessor 305 may also be in communication with crypto-authentication chip 350. Note that the device may be powered by a power source 355, which may comprise batteries and/or external power.

As noted above, it is desirable for the device to provide sensing and edge processing techniques for extended periods of time without requiring frequent battery changes. It is a goal of the present invention to provide devices that may be operated for a long period of time (such as up to five years or more) without requiring maintenance or battery replacement. The technology disclosed achieves efficiency in power management by providing improvements in both hardware and software components of the system.

To reduce the power consumption by cellular data modem, some embodiments of the present invention utilize data compression when sending data from the device. For example, the device may operate in an "anomaly mode," wherein the system may power up components and engines on the device in a tiered manner and may send anomaly data to the system administrator when an anomalous behavior is detected. In general, one or more sensors may be powered on at scheduled intervals to collect data and process the data to determine anomalous trend in collected data. If an anomaly is detected, the device may power on more sensors and may provide data from sensors to inference engine to classify the anomaly. If the machine learning inference engine classifies the data as anomalous, the device may power up the wireless communication module and send the anomalous data and/or a classification from the machine learning inference engine to a system administrator.

In greater detail, the present invention may utilize and/or implement anomaly detection techniques in a tiered manner. At the lowest end of the tier, a threshold can be used to determine if further analysis is needed. For example, vibrations detected above a pre-defined threshold can be analyzed to determine if the pattern or trend of vibration data indicates an anomalous shake or a non-anomalous shake. If the vibration data indicates a non-anomalous shake, the system can power off the sensor for a predetermined amount of time. Thus, using the tiered power management technique, the technology disclosed can operate with very low power consumption. The components or engines requiring higher level power consumption such as inference engine, and cellular communication modules can be powered off for long durations of time. On the other hand, if no anomaly is detected, the system transitions back to a lower power management sleep state. This tiered power management scheme enables the devices to operate for many years without requiring any maintenance or battery replacement.

It is also contemplated that the device may operate in a "background mode," where the device may wake up at pre-determined time intervals, such as once per day, once every two days, once a week, etc. The device may then send the user (such as an administrator) sensor data such as minimum and maximum temperature measurements, minimum and maximum humidity measurements, and any other data collected from the monitored device in a compressed form.

Figure 4:
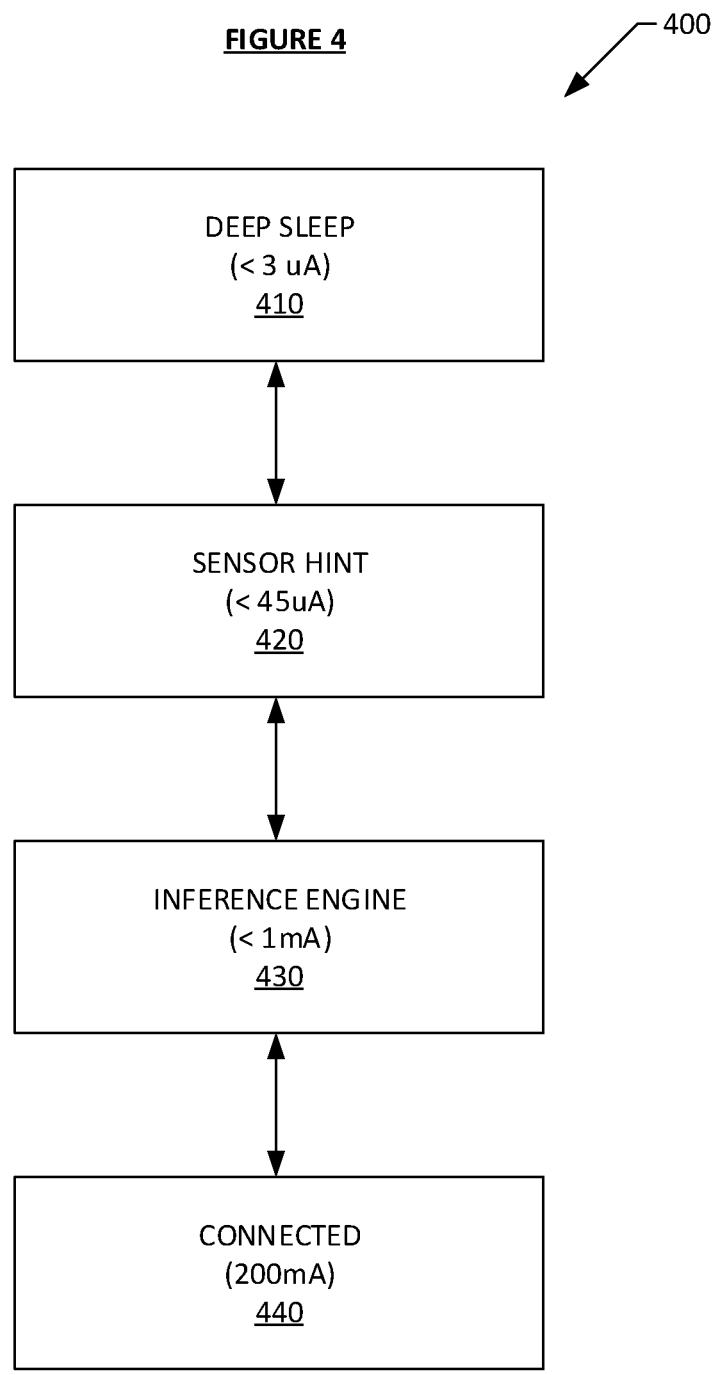
FIG. 4 illustrates, in accordance with some embodiments of the present invention, an exemplary power saving protocol.

With reference to FIG. 4, the technology disclosed can implement anomaly detection techniques in a tiered manner. FIG. 4 also indicates exemplary approximate power consumption of the device in respective power states. For example, at 410 the device may consume three (3) micro amperes or less when it is in "deep sleep" state also referred to as sleep mode above. In this state, all components of the system may be powered off except one sensor.

When the device processes a sensor hint at 420, the power consumption can be 45 micro amperes or less. If the sensor hint is above a threshold, the system can gather further data from one or more sensors and provide that to the machine learning inference engine to detect anomalous behavior of the monitored asset at 430. In this state, the power consumption can be 1 milli amperes or less. If the machine learning inference engine classifies input data as anomalous, the system can power up the cellular modem to transmit to the user, the anomaly classification and the data from sensors which is used to determine this classification at 440. This power mode of the device is referred to as "connected" mode and can consume about 200 mA.

Sensors on the devices can generate interrupts based on thresholds such as amount of vibration on the accelerometer, rate of change of temperature or temperature threshold on the temperature sensor, rate of change of humidity or humidity threshold on the humidity sensor, etc. The system can also use microphones as sensors. For microphones, the system can measure the magnitude of the sound signal as a sensor hint to determine when to send an inference. In general, the system looks at hints in sensor readings to indicate when a threshold is crossed. If so, the system powers up the machine learning inference engine to classify the trends in data. A so called "hinting engine" can also be powered up to record samples of data collected from sensors to store as historical data. This time series data can be used as input to inference engine (such as deep learning model) to allow classification. If the "signal qualifies" meaning the machine learning inference engine classifies the input as a potential anomaly (also referred to as a real event), we wake up the cellular modem and upload the alert (output from the machine learning inference engine) and the data used for this classification to cloud-based storage where a user can view or analyze it. The uploaded data can also be displayed as part of oscilloscope view illustrating the time series data that caused the alert.

In one example device, a sensor on device can consume about 10 to 20 micro amperes of power. About 500 micro amperes or more can be required to operate the machine learning inference engine and more than 100 milli amps to run the wireless cell modem to send the data from device to a user. The technology disclosed therefore can use a combination of sensor hints, Edge ML (i.e., the machine learning inference engine), and narrow band cellular communication to conserve power on devices. On average the device requires about 45 micro amperes of current which allows the system to operate the device up to 5 years or more without requiring battery replacement. For example, in one example, the system can use two 3.6 volt, 2000 milliamp-hour (AA sized) batteries to power the device. The technology disclosed can include efficient DC to DC power converters such as manufactured by Texas Instruments™, and can turn off all components including the cellular data modem which can consume 10 micro amperes in power save mode or sleep mode.

Multiple Sensors. Note that the technology disclosed can combine data from various sensors and provide this as input to a machine learning inference engine operating in the device or on the cloud. For example, the technology disclosed can combine the data from a temperature sensor and a vibration sensor to classify anomalies or conditions at the edge (such as the asset being monitored) from the machine learning inference engine.

Multiple Devices. It is worth noting that many assets and systems may require and/or benefit from the use of multiple devices. However, it has been determined that the use of devices in accordance with the present invention may greatly reduce the number of sensors applied by current technologies in the art.

Consider a midstream compressor used in the oil and gas industry. Current technologies recommend approximately forty-five (45) sensors. However, using devices in accordance with some embodiments of the present application, similar data and control can be captured using approximately eleven (11) sensors. Devices may be placed at specific locations—for example in close proximity with crosshead guides and crankshaft locations. Each sensor may independently communicate with the cloud, and each inference engine at the edge may be specially formulated for that specific sensor. However, at the cloud level interactions between sensors may be considered, which may result in a better understanding of the health of an asset, and/or may be utilized to determine trending anomalies that do not independently exceed criteria, but as a system indicates a trend towards anomaly or fault.

For example, multiple devices on a single asset may be controlled to sample data at the same (or approximate same) time, thereby providing a more complete snapshot as to the functioning of the asset. This combined data may be reviewed and/or analyzed to determine overall states of assets.

In this manner, multiple devices or sensors may be used to create a virtual machine of the asset for predictive analytics in the cloud.

Configuration. As noted above, there are various advantages of the present invention over existing technology and art, including but not limited to ease of deployment and on-boarding. It does not require wired connections, gateways, access points, power or custom software. The remote monitoring system can be setup in minutes without requiring expert technicians for installation. The system can immediately start remote condition monitoring of assets.

In general, setup may be accomplished in several different ways. First, a user may identify the type of asset, including providing relevant characteristics or qualities (gear teeth, ratios, etc.). However, it is understandable that such information may not always be easily accessible, and the time of entering such information for each machine may be inconvenient. However, in a second version a user may take a picture of a nameplate or of a device, the device may be identified, and models may be determined. Automatic machine identification and predictive analysis may be performed using computer vision and frequency analysis. As noted, a user (such as a factory technician) may take a picture of a name plate on an asset and upload the picture to the cloud. Using computer vision, the cloud processor may then determine characteristics of the asset, such as name, model, manufacturer, internal details, and other information.

During use of the asset, the device may determine time and frequency information of the asset and run a deterministic analysis on the structure of the machine. Based on the combination of the computer-vision enabled identification and information from the device, the cloud may fully identify the machine, how it has aged or worn, and/or current or pending issues with functionality. Predictive analytics can then be applied.

In general, provisioning, registration, authentication, etc. are performed automatically. Direct device-to-cloud architecture obviates the needs for wires, gateways, etc.

Model Creation and Training. Systems and methods of the present invention may generally be broken down into (i) enabling anomaly detection; (ii) data collection; (iii) model training; (iv) model deployment; (v) and model execution. Enabling anomaly detection may comprise using a backend system component deployed in a cloud that may receive a request (such as from a user interface) when a user enables anomaly detection for a device. Upon receiving a request to enable anomaly detection, the system component deployed in a cloud may make a request to AI workflow API which can respond with the data collection configuration for the model to be trained.

Data collection may be performed, for example, by the backend system in the cloud receiving data. Data may be received from devices mounted on assets and accumulated in the cloud. Models may then be trained based on the data collection. For example, a generalized model training script may be executed with provided training data. When a model finishes training, the script can convert the model to a format that will allow it to be run on the device (including any necessary data compression). When model compression is complete, the script running on the training server will upload the model file to a cloud-based storage and send the resulting URL to the system for deployment.

For deployment, the system may receive the URL of the model file and may perform their own implementation to get the model onto the device. Once the model file is on the device, the system may have on-device code for initializing the machine learning inference engine. During model execution, the system may develop on device functionality that accesses the appropriate sensor data buffers, executes pre-processing, and feeds these models to the initialized inference engine. The system can fill buffers with model prediction and model samples that resulted in positive predictions for the rest of the on-device code to leverage.

Figure 5:
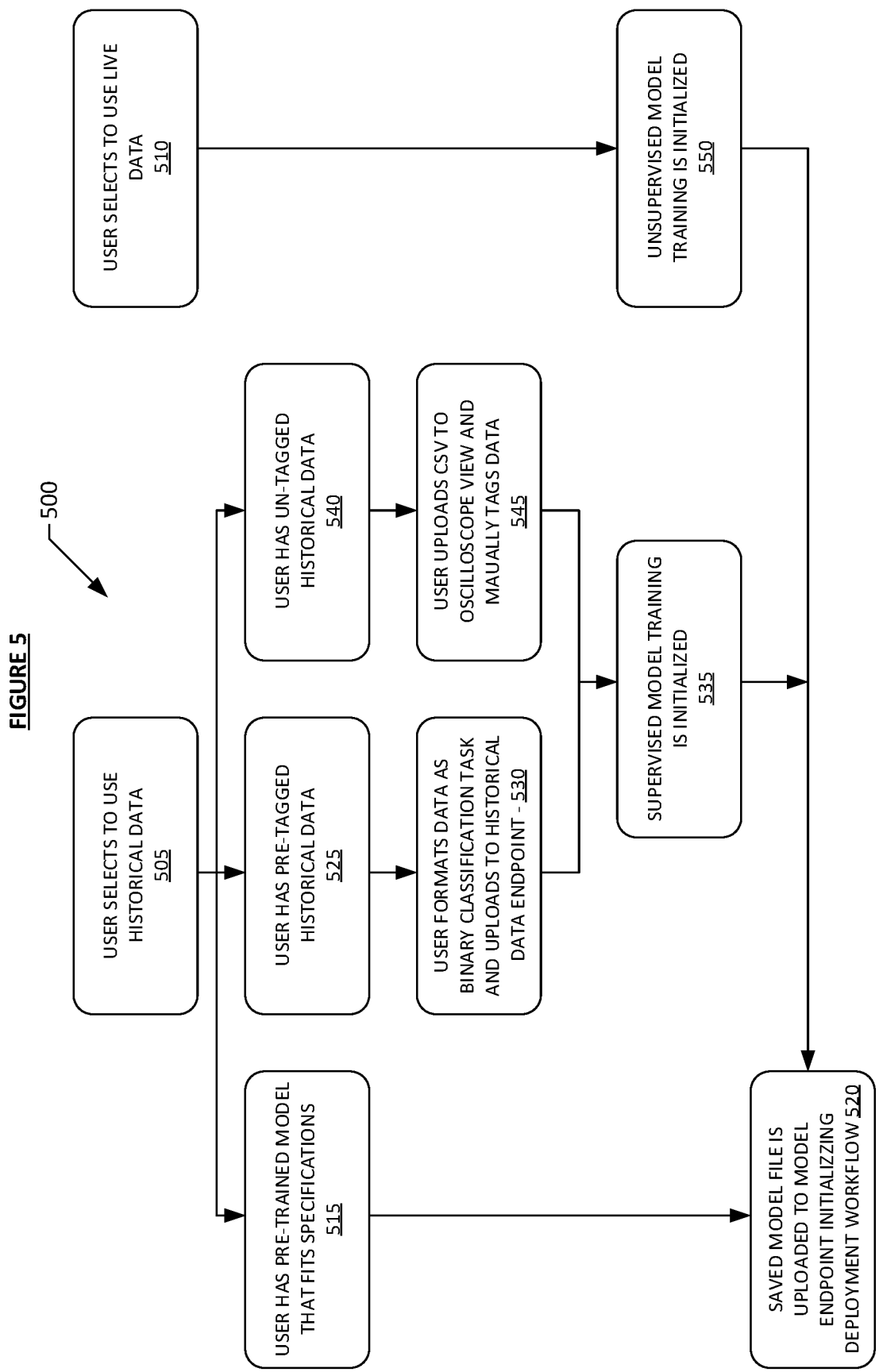
FIG. 5 illustrates, in accordance with some embodiments of the present invention, an exemplary model development workflow.

As noted above, models may be created from historical data and/or live data. With reference to FIG. 5, an exemplary flow 500 of model creation can be seen. Note that the system may isolate a creation of a model from deployment thus allowing highly specialized systems for large deployments of devices.

First, a user may determine which path to follow—the use of historical data 505, or the use of live data 510 from the device. If the user selects to use historical data, then it may first be determined if the user already has a pre-trained model at 515. For use, such pre-trained models would need to fit specifications of the system. If so, this model is saved at 520 and uploaded to the model endpoint.

If the user does not have a pretrained model, but has pre-tagged historical data at 525, then such data may be formatted at 530 and uploaded to the system (via the cloud). Supervised model training is initialized at 535, and once complete, uploaded at 520. If the user had data, but it is un-tagged at 540, then such data and oscilloscope view may be utilized to manually tag the data at 545, after which supervised model training is again initialized at 535, and saved and uploaded at 520.

However, the present invention also provides users with a more convenient methodology wherein historical data is not required. At 510 a user may select to use live data, captured from a device in accordance with some embodiments of the present invention. At 550, unsupervised model training is initialized, which is subsequently saved and uploaded at 520.

Figure 6:
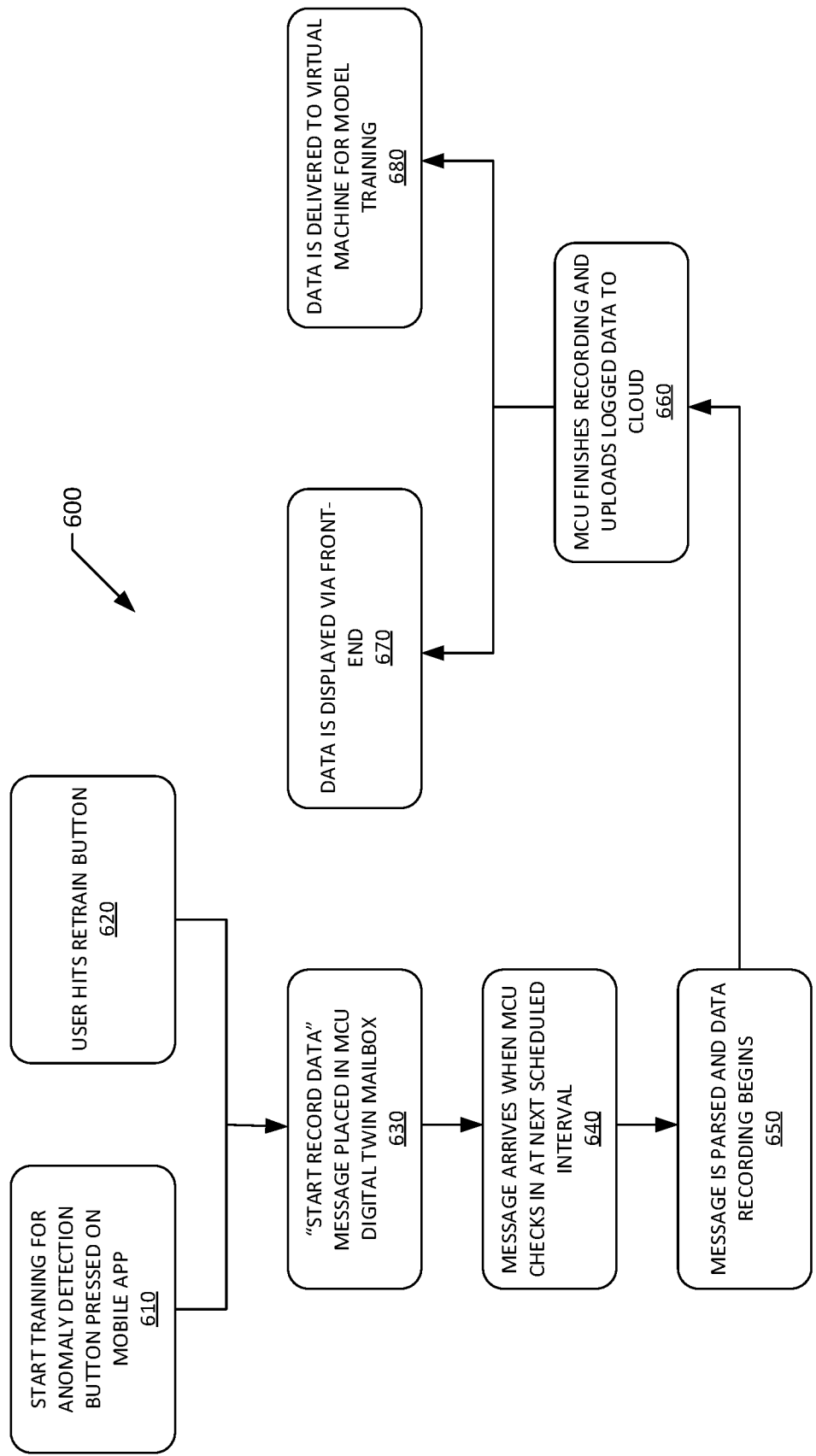
FIG. 6 illustrates, in accordance with some embodiments of the present invention, an exemplary process for acquiring training data.

With reference to FIG. 6, the capture of this live data as training data is described in greater detail. Note that the time duration for which the training data is recorded as well as many other settings of data collection are configurable. These additional settings include but are not limited to sensor sampling rate, sensor data pre-processing, and device wake pattern.

At 610 training is initiated. Note this may be initiated using a mobile application, dashboard control, or by merely starting up the device. If a device has already been trained or is to be retrained, such command can also be provided at 620. At 630 a "start recording" message may be received at the microprocessor of the device. When the device checks in at 640, the message may be received, parsed at 650, and data may then be recorded. Once recorded at 660 the data may be uploaded from the device to the cloud, after which the data may be displayed on the front-end (for example, oscilloscope-type view) at 670, and may also be delivered to the cloud for model training at 680.

Figure 7:
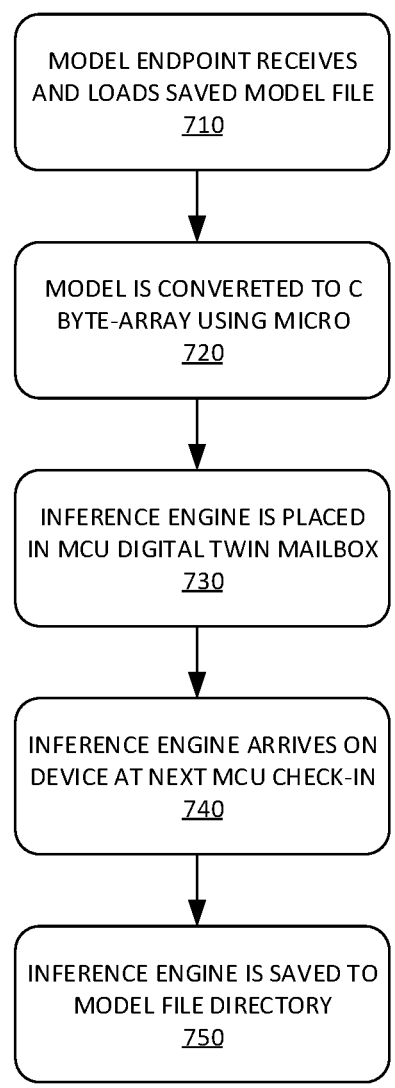
FIG. 7 illustrates, in accordance with some embodiments of the present invention, an exemplary process for deploying models.

Once a model is created by the cloud it is uploaded to the device. With reference to FIG. 7, a model endpoint may receive a model file to be uploaded at 710. At 720, the model may be converted to a C-byte-array for compression purposes. At 730, the machine learning inference engine may be placed in the microprocessor mailbox, which when the device checks in next at 740, may arrive on the device, and may subsequently be saved to a model file directory at 750 on the device.

In the following description, various features are discussed to illustrate ease of on-boarding and configuration. Set up may vary depending on whether the device is connecting directly to the cloud via cellular communications, or through a micro-gateway. If a micro-gateway is used, a user may name a device, undergo initial provisioning, and the device may be connected to the cloud-based account of the user. The user may then press the button on the device, which may trigger the device to search for available networks. Once identified and online, the system may begin the process of assigning this device to a Cloud account associated with a user. This process can take any amount of time, though it is expected to take approximately three (3) minutes, but the time taken to do this can be dependent upon internet connection. Once complete, the device may reboot and connect to the account associated with the user. Once connected, a user may be able to make changes to this device using the account associated with the user without having to go through this provisioning process again.

During provisioning, the device connects to cloud and may result in a 'soft device' being created on the cloud. This may act as the digital twin of the monitoring device.

The system allows for creating device profiles that then may quickly be applied to multiple devices. With just a few clicks, a user may apply this device template and quickly start logging from remote devices. This feature may save considerable amount of time for users or system integrators that have multiples of the same units out in the field. To create a device profile, this may be done from the device's web site. A profile may consist of the common settings, the analog input setup, digital input/output (I/O) setup, and the Modbus RTU setup. A user may set common settings and the I/O that he is using. The user may set cloud update interval which indicates how often the recorded data is then updated up to the cloud. Shorter intervals will consume more data and exhaust user's data prematurely. The user may select measurement unit such as either voltage or current. The period update determines how often this analog point will be logged. The change of value determines how much a change in this value before this is logged to the cloud. The user may select if it is digital input or output. As with the analog, user may set a periodic update rate for each point. A user may select this to be active when the input is high or when it is low. Similarly, a user may select this as edge trigger, rising edge, falling edge, or both. Then provide a label for the input at zero and when the value is 1. When this is done, the user may select to save this point and may optionally set up another input and output. The system may also present an estimate of how much data the user will be using. The user may then apply this profile onto the provisioned device.

The collected data from device may be reached from anywhere in the world with an internet connection, either through the web-based app or the smartphone app. The user may select a desired time span, the device that these logs originated from, and/or which sensors the user wants to view. The user may also export this data. Data may be exported via a schedule or manually. The manual export may send a one-time report to the email account associated with this account. The scheduled export may send a report on a regular interval specified in the setup. These reports may be in a CSV format, other data formats such as in portable document format are also possible. Local Intelligence on these far-edge devices (IoT sensor, Wireless IoT bridge, etc.)

Local rules engine enables filtering out data and sending only relevant or useful data to cloud or make certain time critical decisions locally. Even though these rules are implemented locally, rules may be configured and reconfigured by end user from cloud and change these anytime with a few simple clicks in cloud.

Edge Processing. One of the ways in which the present invention can provide a device with an extended battery life (such as over five (5) years), is through the use of processing at the edge. In other words, machine learning models and digital signal processing techniques may be applied at the far-edge device so that only relevant data that represents an anomaly—or periodic data—is transmitted to the cloud. Machine learning on far-edge device (such as, but not limited to, TensorFlow Lite Micro and other types of ML inference engines) to detect other anomaly conditions, which are not easily defined with local rules engine on device, coupled with sending data to cloud only when anomalies are detected on narrowband wireless networks (CAT M1, NB-IoT, LoRa, etc.) may provide significant power savings.

In short, the system analyzes data received from the sensor to determine trends. If the trend analysis indicates a possible issue or matches the trends of an impending failure of the equipment, the system can turn on power to various components of the device in a tiered manner, initiating a communication to the cloud and/or triggering an alert or corrective action to a user. This enables the system to perform more detailed analysis of the data received from the sensor as well as combine the data with data received from other sensors in the devices.

In other words, based on sensor readings predictions are determined. Such predictions are then compared to subsequent sensor readings, and if there is a discrepancy between the two values that is greater than an acceptable threshold—or if there are enough differences within a period of time—an anomaly is considered detected and alerted.

Figure 8:
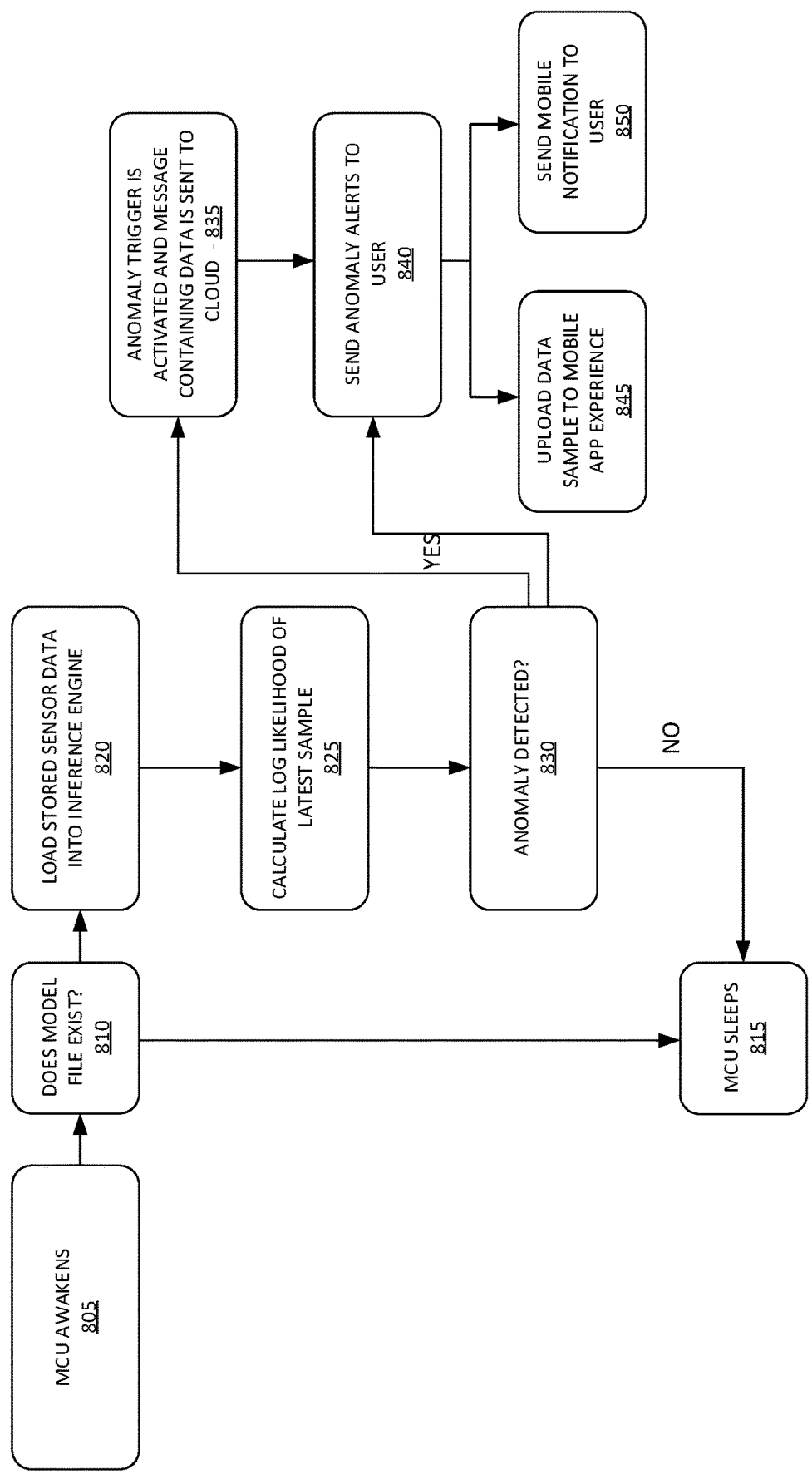
FIG. 8 illustrates, in accordance with some embodiments of the present invention, an exemplary process for inference on the edge.

With reference to FIG. 8, an exemplary flowchart 800 illustrating process steps for inference on devices will now be discussed. At 805, the processor awakens and determined at 810 if a model exists. If a model to be applied does not exist (for example, the device has not yet been provisioned or assigned to an asset) the processor and device shuts down and sleeps at 815. If a model is detected, then at 820 stored sensor data may be loaded into the machine learning inference engine. At 825, information from the latest sample is calculated and/or logged. At 830 it is determined if an anomaly in the data is detected. If not, the processor and device powers down and sleeps again at 815. If an anomaly is detected at 830, at 835 an anomaly trigger is activated and a message containing the data sample that indicated the anomaly is sent to the cloud. At 840, an alert is sent to a user, and at 845 the data sample indicating the anomaly may be uploaded to a user's mobile application or may be sent to a user in a notification at 850.

Figure 9:
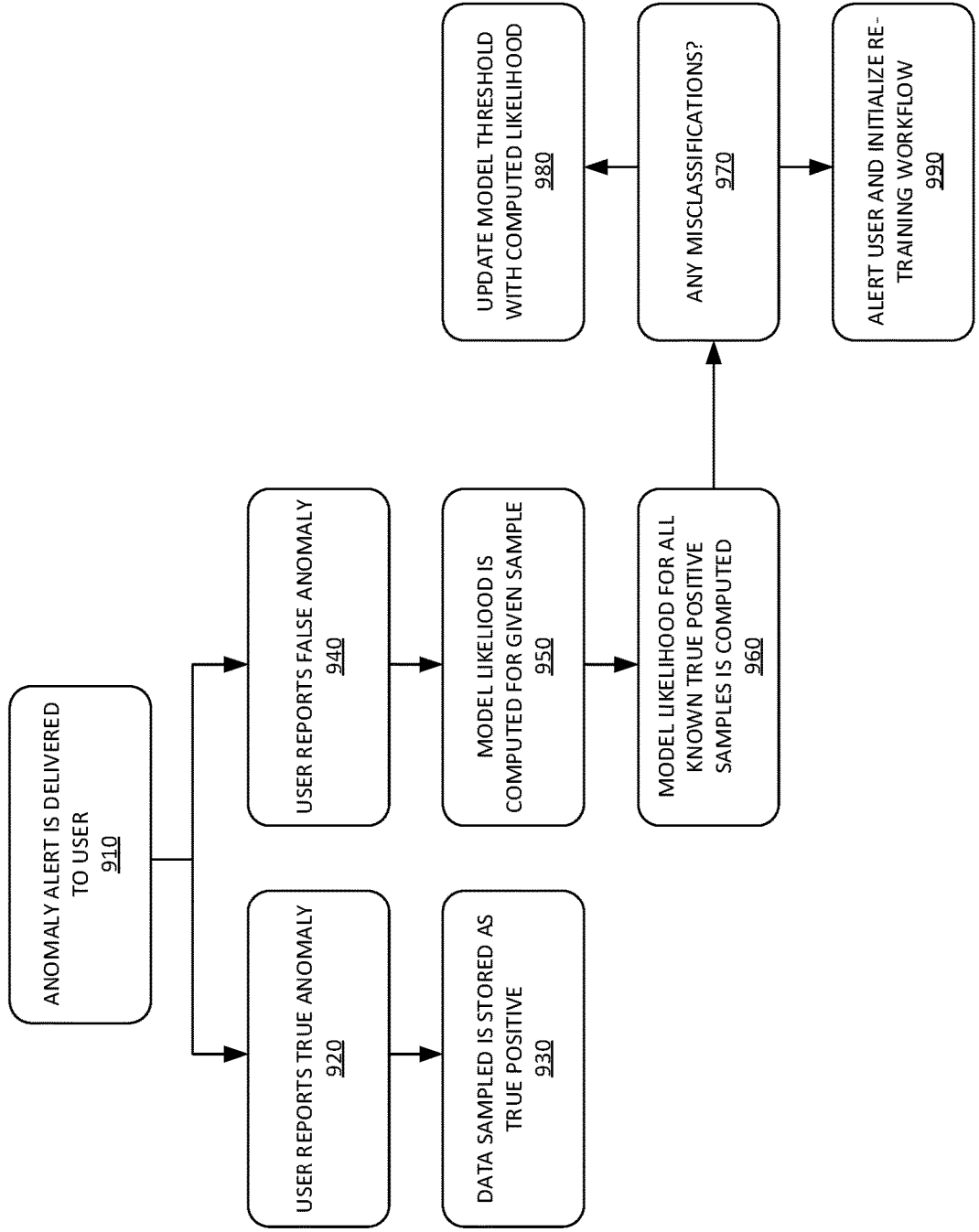
FIG. 9 illustrates, in accordance with some embodiments of the present invention, an exemplary process for generating alerts.

It is notable that some identified anomalies may not indicate actual issues with the asset. In such situations understanding that the anomaly does not represent a problem is important in training the model. With reference to FIG. 9, an exemplary general process 900 for using information pertaining to anomaly alerts is illustrated. At 910 an anomaly alert may be delivered to a user. The user may then determine if the anomaly is an actual anomaly or is false. At 920 a true or actual anomaly is reported, and at 930 the data sampled is stored as a true positive, or actual anomaly for future models.

If at 940 the user indicates or reports that the identified anomaly was false, at 950 the model likelihood is computed for the sample of data that indicated the anomaly. At 960 the model likelihood for all known true positive anomalies is computed or otherwise determined. At 970 it is determined if any models and/or data were misclassified, following which the model threshold with computed likelihood is updated at 980 (and subsequently uploaded to the machine learning inference engine), and at 990 the user is alerted and a retraining workflow is initialized.

The user may also setup email notifications when values of collected data are out of range. The user may select the sensor or tag that we are triggering this rule based upon. The user may select the Modbus tag that is reading data from remote sensor, and the user may use this rule to trigger when the data value is above a threshold.

Figure 10:
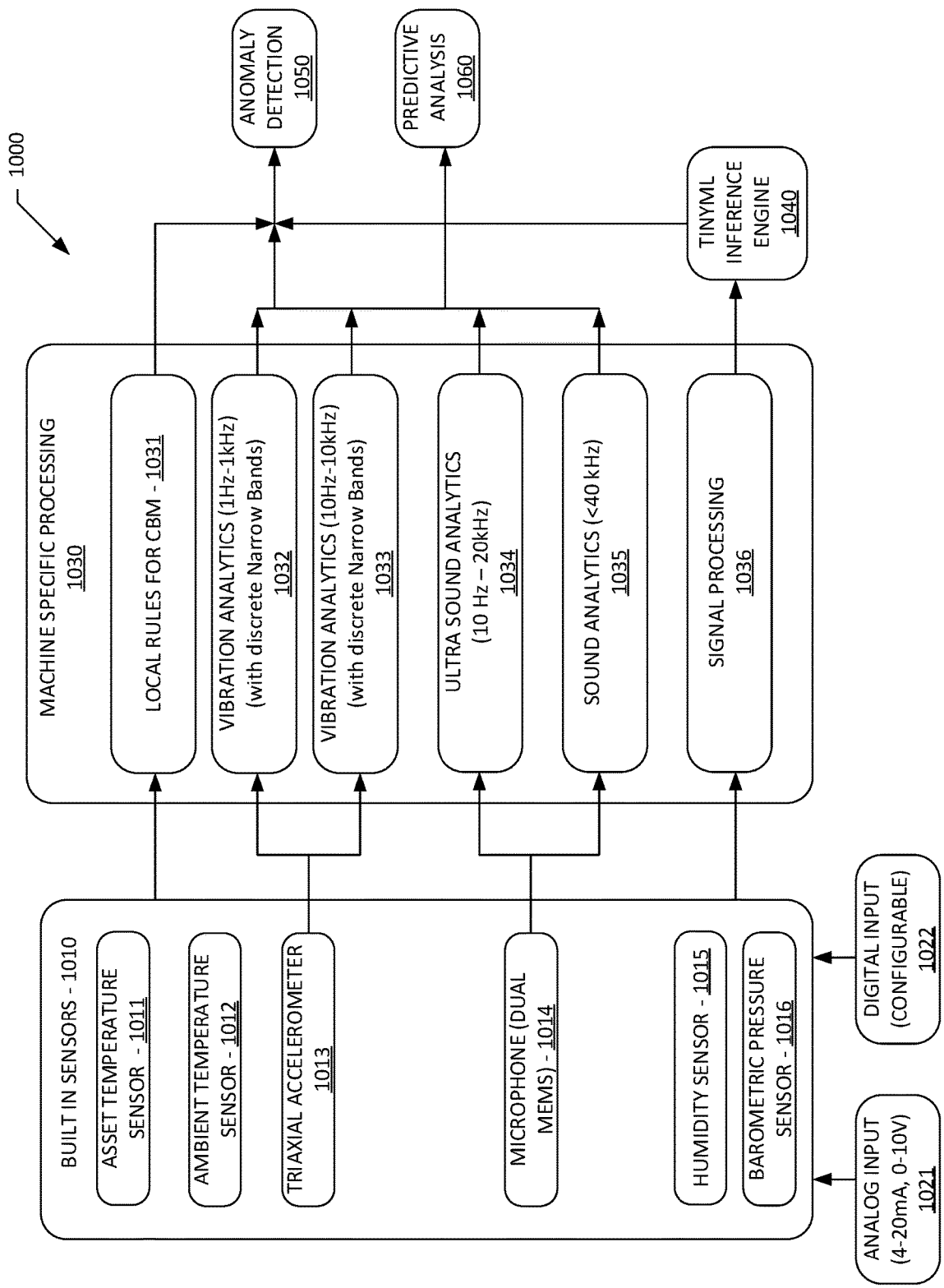
FIG. 10 illustrates, in accordance with some embodiments of the present invention, an exemplary flow depicting machine specific processing and outputs.

With reference to FIG. 10, edge intelligence is graphically illustrated. As discussed above, devices may receive data from various sensors, including built-in sensors 1010. Built-in sensors 1010 may comprise an asset temperature sensor 1011, ambient temperature sensor 1012, triaxial accelerometer 1013, dual MEMS microphones 1014, a relative humidity sensor 1015, and/or a barometric pressure sensor 1016. Inputs may also be received from an analog input 1021 and/or from a digital input 1022.

Using data captured by the one or more sensors, machine-specific processing may then be conducted. Condition based maintenance (CBM) rules may be applied at 1031. Using data from the accelerometers, vibration analytics may be applied 1032, 1033, including narrow band analysis. Sound analytics 1034 and ultrasound 1035 analytics may be applied to data captured by the MEMS microphones. Signal processing 1036 may be applied to various data.

Signal processing data 1036 may be provided to the machine learning inference engine at 1040. Information from the machine learning inference engine and the various processing 1030 may be utilized for anomaly detection 1050. Sensor data may also be utilized in predictive analytics 1060.

As discussed, the present invention provides an end to end artificial intelligence (AI) workflow to train machine learning models. The trained models are deployed as inference engines on devices. The AI workflow can deploy supervised and unsupervised models to devices to detect anomalies. The AI workflow can train and deploy machine learning models on devices.

In general, the AI workflows exists for training and deploying ML models in cloud. It is worth noting that prior art solutions cannot train and deploy ML inference engines to millions and billions of tiny (far-edge) IoT devices in the field. Models may be re-trained and new inference engines need to be deployed at very large scale. In short, classic ML models may be encapsulated into TensorFlow Lite Micro framework and use the same mechanism to deploy neural or non-neural models to sensors. Using a small model, for example, comprising a few hundred parameters, a machine learning inference engine operates on raw accelerometer waveforms and attempts to predict the future—that is, determine next likely states. By comparing predictions to actual sensor readings, the model can detect an anomaly.

Figure 11:
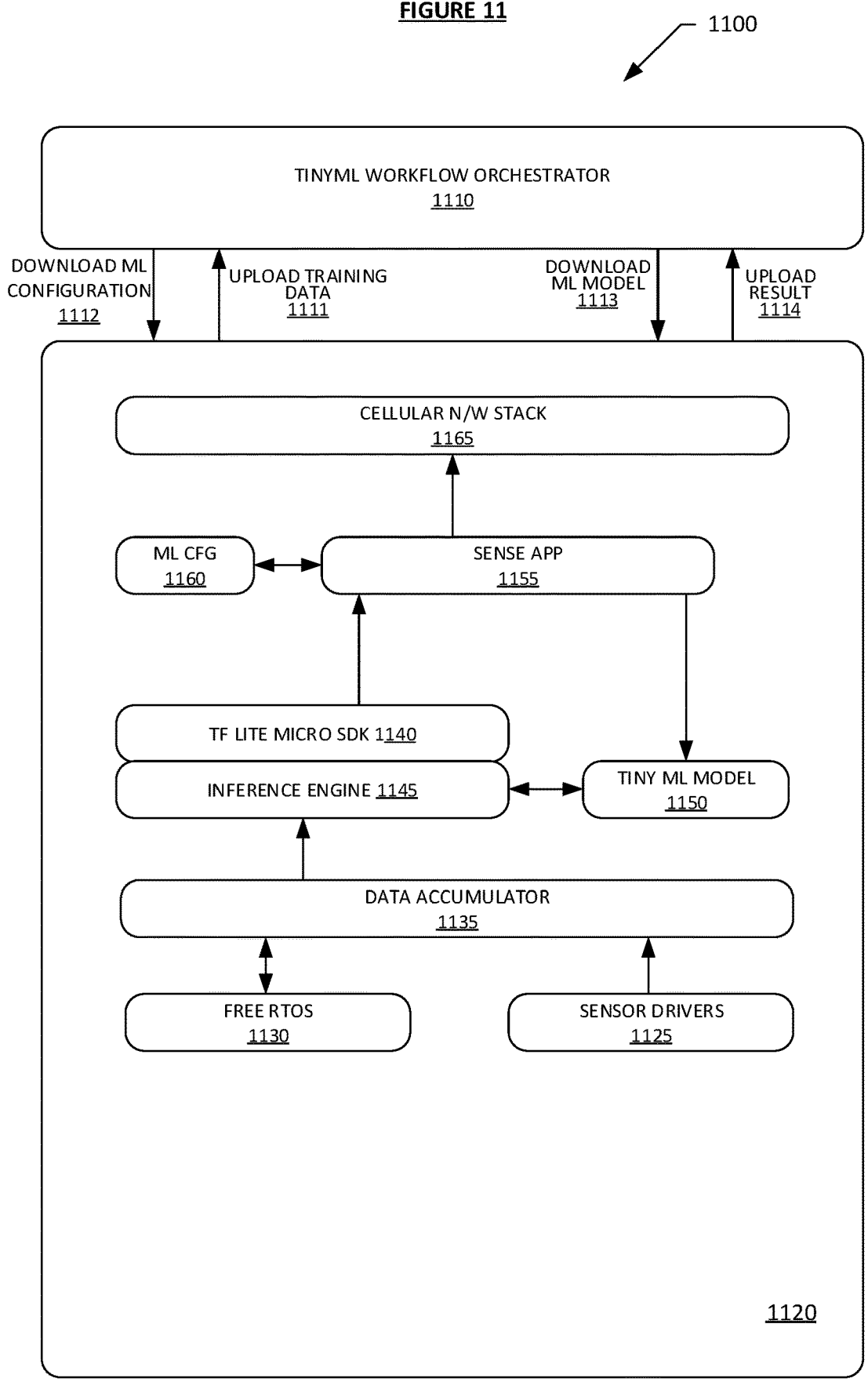
FIG. 11 illustrates, in accordance with some embodiments of the present invention, a workflow orchestrator.

With reference to FIG. 11, an exemplary workflow orchestrator is illustrated, showing both a training mode and an inference mode of a device 1120. In general, device 1120 may comprise one or more sensor drivers 1125, an operating system (such as but not limited to a real-time operating system) 1130, a data accumulator 1135, a software development kit (SDK) 1140—such as a TF Lite micro SDK— coupled with a machine learning inference engine 1145, a machine learning model 1150, a sense application 1155, a ML CFG configuration 1160, and/or a cellular stack 1165. The device 1120 may upload training data to a workflow orchestrator at 1111 and download a machine learning configuration at 1112. Note that during training, the machine learning model 1150 and the machine learning inference engine portion may not be functional, as no analysis is being performed. Rather, during training mode, data is being captured at the edge and uploaded, and machine learning configurations (for example, based on this data) is received.

During inference mode, the machine learning model and the machine learning inference engine are active and performing processing at the edge. The device 1120 may then download a machine learning model from the orchestrator 1110 at 1113 and may upload a result of its processing and analysis at 1114.

When discussing an end-to-end machine learning flow, there are several details and/or factors to consider. Before moving to a detailed discussion of an end-to-end machine learning flow, it may be relevant to set forth certain factors and/or assumptions that support such discussion. For example, in the following discussion it is assumed that each device collects its own data, and data coming from sensors is unlabeled. Each device may decide when and how much of the data is to be sent following a determination of an anomaly. Each device may have its own independent model, such that changes to a model of one device will not affect a different device. It is contemplated that each device-specific model may evolve from the dataset associated with that specific model. In other words, there may not be any transfer learning—that is, data from multiple devices may not be pooled for training the model. However, it may be desirable to store tags associating or linking two (2) different models with each other, in order to generate a "compound inference." In accordance with some embodiments, it may be more desirable to monitor a system of devices associated with a customer than an isolated device.

At a high level, when machine learning is enabled on a device, the device may be in one (1) of four (4) modes or states: (i) inaugural training mode (IT mode"); (ii) routine inference mode ("RI mode"); (iii) User Triggered Training Mode ("UTT mode"); or (iv) Supplemental Training Mode ("SU mode"). Note that as a device transitions from one mode to another the cloud may sync with the device. Each mode will now be discussed in detail.

When a device is provisioned for the first time, the machine learning (ML) component starts by default in the IT mode. The initial time period for training may default to a certain period of time (for example, one week), however such defaults may be overridden during provisioning. In general, the training mode should be set for as long it may take for the device to observe all normal phases of operation of the associated asset.

In IT mode, each device may have a ML configuration that may capture required configurations, and such configurations may be captured by the cloud frontend and sent to the device via a separate message. General configurations may comprise the number of days to train (for example, defaulting to one week), and the frequency of data gathering per day. Note that if a model is already available for a device (for example, from other devices, historical data, etc.), a device may not enter IT mode and may instead start in RI mode.

During IT mode, the device may be configured to log data at a rate higher than what is required for routine operation of the device. However, as such increased sampling may consume more battery power per day, the use of IT mode may be tracked and limited. Data collected by the device may be sent to the cloud and the sensordata database. Such information may be tagged as normal or baseline, and may be used to build an unsupervised model, as well as retrain the model whenever necessary. Note that as illustrated in FIG. 11, during IT mode, anomaly detection may be disabled.

Once the term of collecting training data during IT mode expires, the device may move to Routine Inference (RI) mode. This transfer may occur automatically when the IT mode interval expires. It is anticipated that devices will spend the bulk of their lifetime in RI mode. When a device transitions to RI mode, the device may download its own device specific tinyML model from the cloud, which may be used by the device as the on-device inference engine.

In RI mode, the device may use a routine profile to log data to the cloud, which may be configured to log and/or send data at a rate that optimizes battery life. The device may fetch data from the sensors, and feed such data to the on-device inference engine. If the machine learning inference engine flags the data as an anomaly, the device may send a trigger to the cloud (for example through MQTT channel), which may subsequently notify a user that an anomaly has occurred.

Data logged may be tagged as normal and used in subsequent training. However, it is contemplated that there may be a risk of desensitizing the machine learning inference engine as the asset wears, potentially causing slight abnormal readings to be missed, and the asset trending to failure. However, the long term data on the cloud may be analyzed and reviewed to determine such trends, and users may subsequently re-tag this periodic data as abnormal if necessary by examining the trend and marking where it went wrong.

Note that in accordance with some embodiments, a device may stay in RI mode unless a user decides to manually correct an incorrect anomaly trigger, or other user action is initiated.

As discussed above, during RI mode an anomaly may be reported by the on-device inference engine that may be a false positive (that is, no true anomaly exists). In such circumstances, it is contemplated that the user may highlight this mistake by the model, thereby improving the model. User Triggered Training (UTT) mode is when the user highlights this mistake, following which the cloud may use data from the false-positive anomaly to retrain the model. In general, UTT mode may be short-lived, but may represent a way in which the end-user may feed information into the process of training a model.

In accordance with some embodiments, for each anomaly report, a user may be presented with an option such as "Flag this anomaly as incorrect," which may be selected by the user if the anomaly represents a false positive. By using this model, a user may be able to help the model correct itself. In some embodiments, a user may select and/or add metadata in this dialog that may be useful or desirable in flagging the false-positive and/or retraining the model.

After retraining completes, the cloud may push the updated model to the device, and the device may begin using the new model and the mode of operation may transition back to RI mode.

Supplemental Training (ST mode) may be utilized if a device is repeatedly triggering false positive anomalies, or is regularly missing actual anomalies. Such circumstances may indicate that the training data used to train the device-specific model was not sufficient to generate an accurate model. In this case, the device may be configured to gather additional data. ST mode may be manually entered by a user, or may be entered upon instruction from the cloud (which may be based on criteria related to an acceptable number of false-positives or missed actual anomalies). In the ST mode, the profile used in the IT mode may be used, or in some circumstances a different profile may be used (for example, a profile with a higher data logging rate). Once the cloud or the user determines that the device has spent enough time in ST mode (that is, gather enough additional data), the device may transition to RI mode.

Note that ST mode may also be supported by oscilloscope data capture mode. In general, if a device is acting badly (false-positives, missing actual anomalies, etc.), a user may take a data sample using a oscilloscope data capture mode, and manually tagging the data as an anomaly and saving such data and tags to the cloud. This may feed into the UTT mode to add missing.

Self-Learning. In accordance with some embodiments of the present invention, self learning and natural language processing may improve the accuracy and efficacy of anomaly detection. Models may be self-trained using anomalies detected by deterministic narrow band settings and/or work orders generated by technicians. In general, this approach uses three (3) components: (i) the edge device; (ii) the cloud; and (iii) work order systems and/or a technician.

As discussed above, the edge device generally (i) collects asset data using sensors and sends data trends and critical data to the cloud; (ii) performs edge processing, comprising signal processing on asset data collected and determine if the data indicates an issue; and (iii) a machine learning model inference engine that determines if there is an anomaly and sends an alert to the cloud if detected.

The cloud may be utilized to perform narrow band processing, work order management, model training, and machine learning classification.

The work order system and/or technician may be utilized to determine if issues flagged by the edge processing narrow band and cloud processed narrow band determinations were fixed and/or addressed. If an anomaly was detected that was not fixed, such information is also used to update the models.

Figure 12:
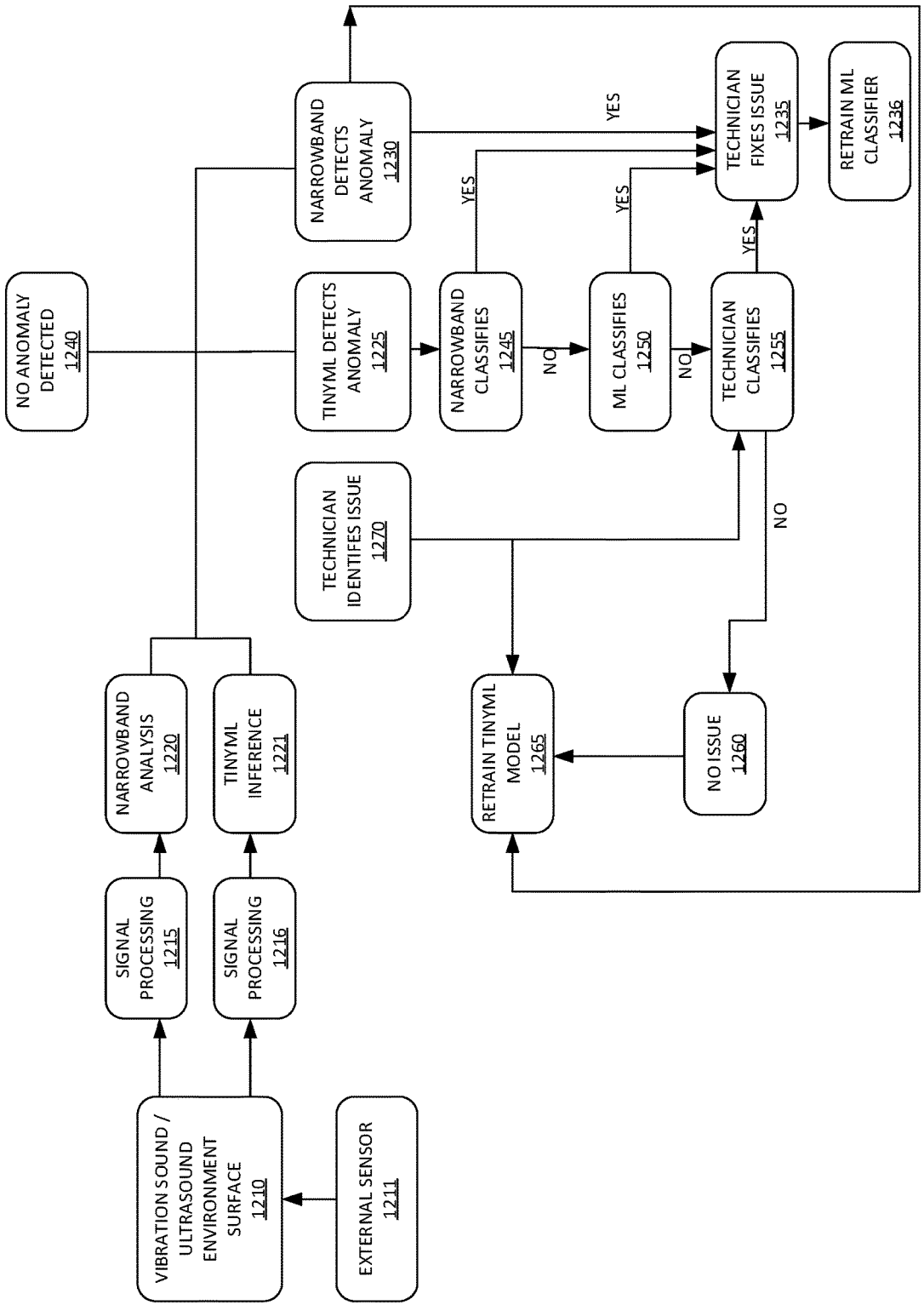
FIG. 12 in accordance with some embodiments of the present invention, an exemplary self-learning process.

With reference to FIG. 12, a general flow for this self-training attribute will now be discussed. The process again begins with sensors 1210, 1211 capturing information pertaining to or associated with an asset. At 1215, 1216 signal processing is performed on this data using at least a narrowband analysis 1220 and the edge processing inference engine 1221. If no anomaly is detected, no action is taken at 1240. If the narrow band analysis detects an anomaly at 1230, a work order is generated and a technician is sent to fix the issue at 1235, following which the model is retrained at 1236.

If the machine learning inference engine detects or determines an anomaly at 1225, it is determined if this matches a narrowband classification of anomaly at 1245. If so, a work order may be generated, and the issue is addressed at 1235. If the narrowband analysis cannot classify the anomaly, it is determined if the machine learning model in the cloud can classify the problem at 1250. If so, the issue may be addressed, and a work-order may be issued at 1235.

If neither the narrowband analysis nor the machine learning model on the cloud can classify the anomaly, then a technician may be sent to investigate and classify the anomaly more fully. If the anomaly represents an issue, it is again addressed at 1235. If there is no issue at 1260, then the models are retrained at 1265.

The system also accounts for circumstances in which no sensor determines an issue, but a technician or operator determines an issue may exist at 1270. Following such manual determination, the technician may investigate further at 1255 and attempt to classify the anomaly, and the models may be retrained at 1265 to incorporate such information in future determinations. Note that in accordance with some embodiments of the present invention, the technician may also have the ability to capture, view, and/or analyze live data from the sensor. This live view, termed oscilloscope view, allows a technician to manually tag data as anomalous, such data which may then be fed into retraining the model.

When working with the work order system, a specialized and connected work-order system may be used, or in some embodiments a natural language analysis may be applied to an existing work order system to determine issues, assets, etc. For example, natural language processing (NLP) utilizing varying forms and levels of artificial intelligence (AI) may be used to parse through text of a work order to obtain meaning and useful inputs for the classifier(s).

Figure 13:
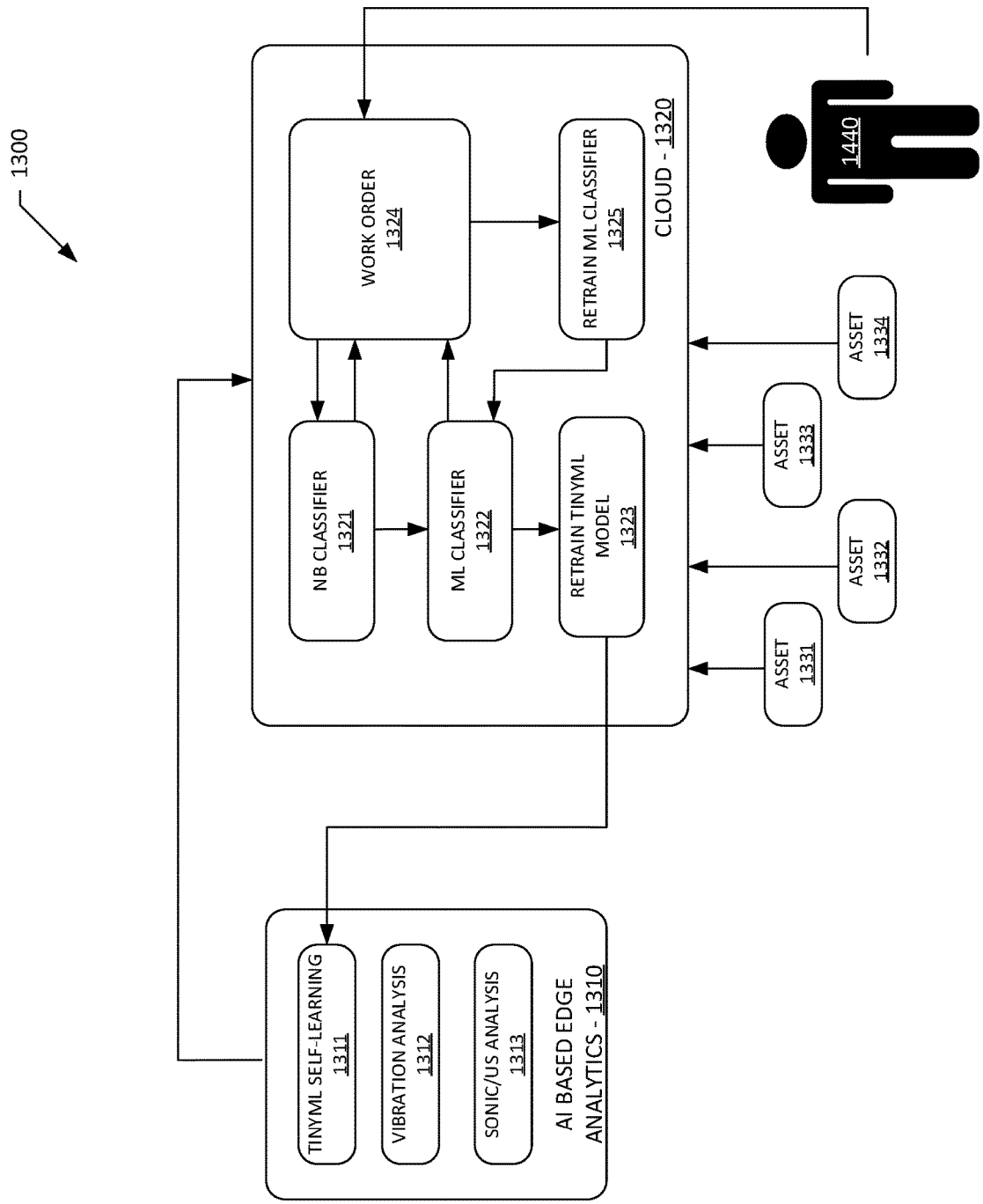
FIG. 13 in accordance with some embodiments of the present invention, an exemplary self-learning process.

With reference to FIG. 13, an exemplary self-learning model 1300 will now be discussed. The system 1300 may comprise artificial intelligence-based analytics 1310, which may comprise some basic analysis at the edge. The AI-based edge analytics may comprise tinyML self-learning module 1311, a vibration analysis module 1312, and/or a sonic/ultrasonic analysis module 1313. The AI-based edge analytics may be in communication with cloud 1320. Cloud 1320 may comprise signal processors such as a narrowband classifier 1321, which may be in communication with both a work order module 1324 and a machine learning module 1322. The machine learning module 1322 may be in communication with both the work order module 1324 and a module that may be utilized to retrain the tinyML model 1323. The re-trained tinyML model 1323 may be in communication with the tinyML self-learning module 1311. The work order module 1324 may receive direct inputs from one or more users 1340.

The cloud 1320 may receive inputs from various assets 1331-1334, each of which may comprise one or more devices or sensors, which may comprise the various AI-based edge analytics illustrated at 1310.

In this manner, and as discussed above with regard to FIG. 12, issues or anomalies may be identified by various layers of analytics—by edge analytics using a tinyML, 1311, a vibration analysis 1312, a sonic analysis 1313, a narrowband classifier 1321, a machine learning classifier 1322, or even a technician performing maintenance 1340, through access to a work order module 1324 and NLP AI processes. Accordingly, actions at any stage may be used to retrain the models—both the machine learning classifier and the tinyML model that may be deployed to the edge.

The IoT Cloud. In accordance with some embodiments of the present invention, machine learning processing may be performed in a distributed computing environment, or cloud. For example, utilizing services provided by Amazon Web Services (AWS), Google Cloud, or other providers, machine learning models may be created, updated, etc. using deep learning techniques, training, and classifiers such as Naive Bayes (NB), Support Vector Machines (SVM), Deep Neural Networks (DNNs), Convolutional Neural Networks (CNNs) and likelihood estimation models such as Gaussian Mixture Models (GMMs), Hidden Markov Models (HMMs), and AutoRegressive Neural Networks, as well as digital signal processing (DSP), analysis, neural-net machine learning, advanced rules engines, for use in a machine learning inference engine at the device.

The cloud may comprise various types of instances and nodes. In order to achieve cost savings, spot instances may be utilized. The availability of low-cost spot instances that may be accessed on demand may permit thousands of models to train simultaneously.

Figure 14:
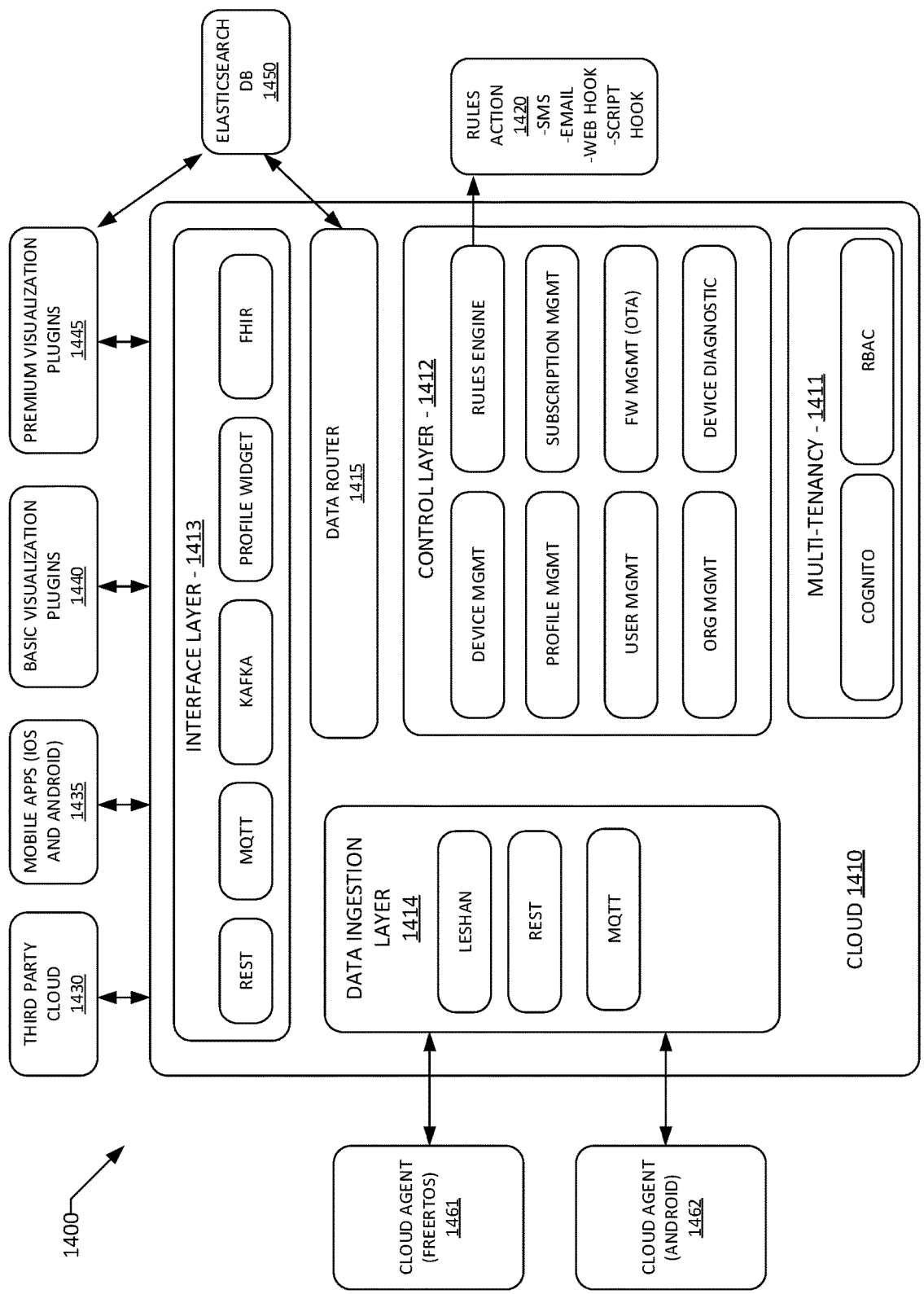
FIG. 14 illustrates, in accordance with some embodiments of the present invention, an exemplary cloud configuration.

With reference to FIG. 14, an exemplary cloud arrangement 1400 in accordance with some embodiments of the present invention may be seen. Cloud 1410 may comprise a multi-tenancy module 1411, a control layer 1412, an interface layer 1413, a data ingestion layer 1414, and a data router 1415.

Multi-tenancy module 1411 may comprise elements for Cognito and role-based access control (RBAC) to provide for security elements.

Control layer 1412 may comprise a device management module, profile management module, user management module, organizational management module, subscription management module, firewall (OTA) management module, device diagnostic module, and/or a rules engine. Rules engine may include actions 1420 such as text messages, emails, web hooks, script hooks, etc.

Interface layer 1413 may provide modules for interfacing with various other platforms, such as MQTT, Apache's KAFKA, etc. Data ingestion layer 1414 may receive information from devices 1420, for example from a cloud agent 1461 running a FreeRTOS operating system or from a cloud agent 1462 running an android operating system.

The cloud 1410 be in communication with various devices to provide different controls, dashboards, and other interfaces. For example, cloud 1410 may communicate with a third-party cloud 1430, such as SalesForce, a customer relations management system, and/or other third-party systems. Similarly, cloud 1410 may communicate with mobile applications 1435 (iOS and Android), may provide plugins for visualization 1440, and may provide information to premium visualization plugins 1445 (such as ELK, Grafana). Note that communications with premium visualization plugins 1445 may also be routed through a database 1450.

Dashboards may present a user with various information regarding one or more sensors, assets, or systems comprised thereof. For example, using a cloud-based dashboard, a user may quickly and easily review charts, frequency analyses, narrowband analyses, multi-sensor fusion, etc. Relevant data may be stored and/or exported by a user to meet the user's specific needs. Dashboards may assist users in condition-based monitoring (CBM), predictive maintenance (PDM) determination, asset performance management (APM), and/or overall equipment effectiveness (OEE).

Security. Note that it is contemplated by the present invention that various levels of security may be required and/or desired. In accordance with some embodiments of the present invention, security may be provided with various levels and approaches. For example, security on devices may comprise transport layer security (TLS) using symmetric cryptography. Devices may comprise a hardware encryption chip and tokens-based access. In accordance with some embodiments, encryption may comply with various encryption standards, such as but not limited to Advanced Encryption Standard (AES) 256. Tokens may be refreshed and periodically rotated (for example, every thirty (30) days) for increased security.

Elements of the present invention that may be cloud-based may be protected using application programming interface (API) tokens, identity provider authentication (such as AWS Cognito User Pool), role-based access controls (with separate log-ins and multi-factor authentication protocols in place), and certificates of compliance from cloud providers. Note that the existence, functionality, and efficacy of such security systems and methods may be periodically examined and confirmed through a security audit, which may test for vulnerabilities, penetration, and IoT device security.

It will be understood that the specific embodiments of the present invention shown and described herein are exemplary only. Numerous variations, changes, substitutions and equivalents will now occur to those skilled in the art without departing from the spirit and scope of the invention.

For example, although the present invention is predominantly directed to the monitoring and anomaly detection in industrial assets, the technology disclosed can be used for additional purposes and in additional use cases. For example, systems and methods of the present invention may be utilized to remotely monitor health of patients at their homes or health care and nursing home facilities. The technology disclosed can include device implemented as a wearable device such as wrist band. The patient can wear the wrist band.

The device can include various sensors, such as biological sensor that may measure a patient's vital statistics such as temperature, heart rate, blood pressure, oxygen level, electrocardiogram (ECG), photoplethysmography (PPG), etc. The technology disclosed can also gather data from other monitoring devices connected to a patient or located within close proximity via wireless connection. The device can operate with a limited number of sensors in the operational mode as described above. This can increase the battery life of the wearable devices and the patient does not need to recharge the device very often. The device may only need to be recharged once a week or once in a couple of weeks due to tiered power management described above. The system can send any anomalous signals along with the classification to a health care professional responsible for patient's care.

Similarly, the technology disclosed can be used to monitor health of pets. In this application, the device can be implemented as a wearable neck band. The device can collect vital statistics of the pets and send any anomalous signals to pet's owner or a health care professional.

Similarly, the system may be used to sample values associated with an influent or effluent in a water or wastewater treatment facility, including testing factors such as biochemical oxygen demand (BOD), chemical oxygen demand (COD), total suspended solids (TSS), total nitrogen, and/or detecting specific chemicals, compounds, or materials in an effluent.

Accordingly, it is intended that all subject matter described herein and shown in the accompanying drawings be regarded as illustrative only, and not in a limiting sense.

What is claimed is:

1. A method of monitoring or predicting a service event for an industrial asset using an artificial intelligence of things (AIoT) device without the need for historical data, the AIoT device being in communication with a cloud-based processor, the AIoT device comprising one or more sensors and an inference engine, the cloud processor comprising a narrow-band classifier and a machine-learning classifier, the method comprising:

during a training mode:
      gathering data only from the AIoT device, the data being collected by the one or more sensors and periodically providing the data to the cloud based processor;
      using the data to train an inference engine and a machine learning model;
      storing the inference engine on the AIoT device to provide edge processing capability;

storing the machine learning model accessible by the cloud-based processor;

during an operational mode:

using the inference engine to determine if the data includes an anomaly, and if so, sending at least some of the data to the cloud-based processor;

at the cloud-based processor, receiving at least some of the data from the AIoT device and classifying the anomaly using a narrow-band classifier, or a machine-learning classifier;

if the anomaly is classified, determining alerts, corrective actions, and/or maintenance requests associated with the anomaly;

if the anomaly is not classified, providing at least some of the data to a technician or work order system;

if the technician or work order system classifies the anomaly retraining the machine-learning classifier based on such classification;

if the technician or work order system determines that the anomaly determined by the inference engine is a false positive, retraining the inference engine based on such determination.

2. The method of claim 1, wherein the one or more sensors comprise an accelerometer, a temperature sensor, a humidity sensor, a microphone, or a pressure sensor.

3. The method of claim 1, wherein the step of using the inference engine to determine if the data includes an anomaly comprises using signal processing techniques comprising deep learning techniques, training, and classifiers such as Naive Bayes (NB), Support Vector Machines (SVM), Deep Neural Networks (DNNs), Convolutional Neural Networks (CNNs), likelihood estimation models such as Gaussian Mixture Models (GMMs), Hidden Markov Models (HMIs), and AutoRegressive Neural Networks, digital signal processing (DSP), analysis, neural-net machine learning, or advanced rules engines.

4. The method of claim 1, wherein the step of sending at least some of the data to the cloud-based processor and receiving information from the cloud-based processor is via a wireless communication system comprising a wireless system on chip (SOC) or a long term evolution (LTE) chip.

5. The method of claim 1, wherein the AIoT device is powered by a battery and the battery provides power to the device for more than three (3) years.

6. The method of claim 1, wherein using the inference engine to determine if the data is anomalous comprises comparing values in the data from the one or more sensors to predicted values, and determining that the data is anomalous when the values in the data and predicted values deviate greater than a predetermined threshold.

7. The method of claim 1, further comprising a background mode, wherein the one or more sensors are periodically energized, gather data, the communication module is energized, and at least some of the data collected is sent to the remote, cloud-based processor.

8. The method of claim 1, further comprising retraining the inference engine by updating a digital twin of the inference engine on the cloud by the cloud-based processor, and sending the updated digital twin of the inference engine to the AIoT device during a device check-in with the cloud-based processor, and saving the updated digital twin of the inference engine to the model file directory of the AIoT device.

* * * * *